(12) United States Patent
Landis et al.

(10) Patent No.: US 11,252,720 B2
(45) Date of Patent: Feb. 15, 2022

(54) SYSTEM AND METHOD FOR POWER MANAGEMENT BASED ON SUBFRAME CONTENT

(71) Applicant: QUALCOMM Incorporated, San Diego, CA (US)

(72) Inventors: Shay Landis, Hod Hasharon (IL); Soumya Das, San Diego, CA (US); David Yunusov, Holon (IL); Hee Jun Park, San Diego, CA (US); James Francis Geekie, Carlsbad, CA (US); Moshe Ben-Ari, Rehovot (IL)

(73) Assignee: QUALCOMM Incorporated, San Diego, CA (US)

( * ) Notice: Subject to any disclaimer, the term of this patent is extended or adjusted under 35 U.S.C. 154(b) by 50 days.

(21) Appl. No.: 16/737,464

(22) Filed: Jan. 8, 2020

(65) Prior Publication Data
US 2021/0212058 A1 Jul. 8, 2021

(51) Int. Cl.
*H04W 72/04* (2009.01)
*H04W 4/40* (2018.01)
*H04B 7/08* (2006.01)

(52) U.S. Cl.
CPC ...... *H04W 72/0446* (2013.01); *H04B 7/0874* (2013.01); *H04W 4/40* (2018.02); *H04W 72/042* (2013.01)

(58) Field of Classification Search
CPC . H04W 72/042; H04W 72/0446; H04W 4/40; H04W 28/0236; H04B 7/0874; H04L 65/1016; H04L 65/1006
See application file for complete search history.

(56) References Cited

U.S. PATENT DOCUMENTS

| 2013/0022083 | A1 | 1/2013 | Vasseur et al. |
| 2017/0079009 | A1* | 3/2017 | Saxena ............ H04W 72/0406 |
| 2018/0059769 | A1 | 3/2018 | Sripathi et al. |
| 2019/0349904 | A1 | 11/2019 | Kwak et al. |
| 2020/0007223 | A1* | 1/2020 | Zhu ..................... H04B 7/2606 |
| 2020/0305019 | A1* | 9/2020 | Karri .................. H04L 65/1016 |

OTHER PUBLICATIONS

International Search Report and Written Opinion—PCT/US2020/063803—ISA/EPO—dated Mar. 12, 2021.

(Continued)

*Primary Examiner* — Wei Zhao
(74) *Attorney, Agent, or Firm* — Danai Nelisile Mhembere

(57) ABSTRACT

User equipment (UE) may benefit from power management techniques, for example, in the context of cellular vehicle-to-everything (CV2X) communication. In various aspects of the disclosure, a method, a computer-readable medium, and an apparatus are provided. The apparatus may be a UE configured to determine whether a first subframe includes at least one sub-channel carrying information intended for the UE, receive the information via at least one receive (Rx) chain associated with the at least one sub-channel when the information intended for the UE is carried on the at least one sub-channel included in the first subframe, and deactivate the at least one Rx chain associated with the at least one sub-channel based on whether the information intended for the UE is absent from the at least one sub-channel included in the first subframe.

25 Claims, 13 Drawing Sheets

(56) References Cited

OTHER PUBLICATIONS

Qualcomm Europe: "Link Analysis of Reference Signals for SFN (Multi-Cell) MBMS", 3GPP TSG-RAN WG1 #45, 3GPP Draft; R1-061512, 3rd Generation Partnership Project (3GPP), Mobile Competence Centre, 650, Route Des Lucioles, F-06921 Sophia-Antipolis Cedex, France, vol. RAN WG1, No. Shanghai, China; May 8, 2006-May 12, 2006, pp. 1-5, May 5, 2006, May 5, 2006 (May 5, 2006), XP050102361, [retrieved on May 5, 2006] Power Saving Mode for Multicast; p. 1, paragraph 1.

Qualcomm Europe: "On Pilot Structure for OFDM based E-UTRA Downlink Multicast", 3GPP TSG-RAN WG1 #43, 3GPP Draft; R1-051490, 3rd Generation Partnership Project (3GPP), Mobile Competence Centre; 650, Route Des Lucioles; F-06921 Sophia-Antipolis Cedex; France, vol. RAN WG1, No. Seoul, Korea; Nov. 7, 2005-Nov. 11, 2005, pp. 1-5, Nov 1, 2005, Nov. 1, 2005 (Nov. 1, 2005), XP050101073, [retrieved on Nov. 1, 2005] Microsleep Mode for Unicast; p. 1, paragraph 2.1; Issues for Multicast; p. 2, paragraph 2.2.

\* cited by examiner

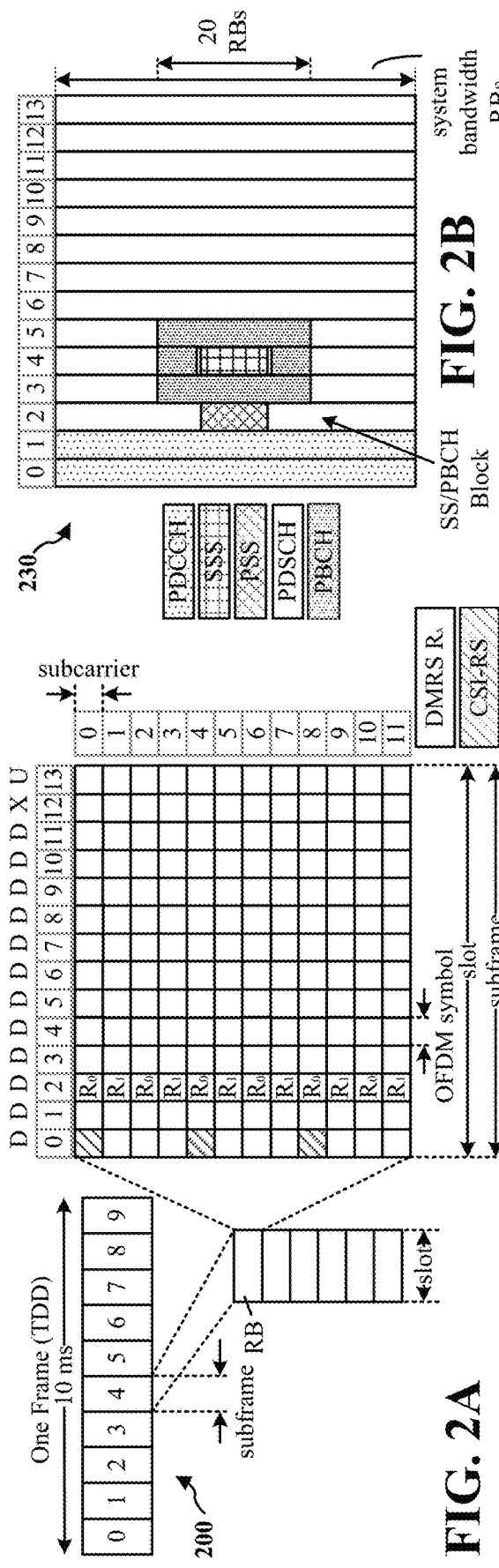
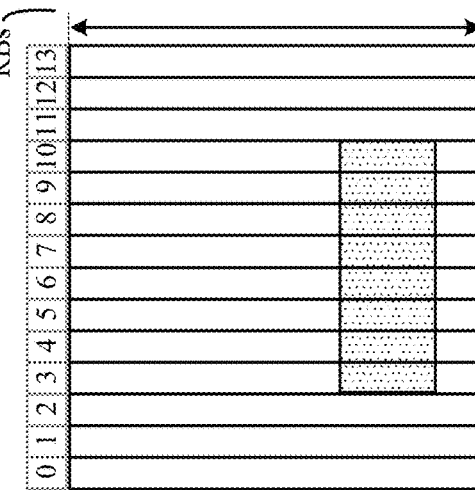
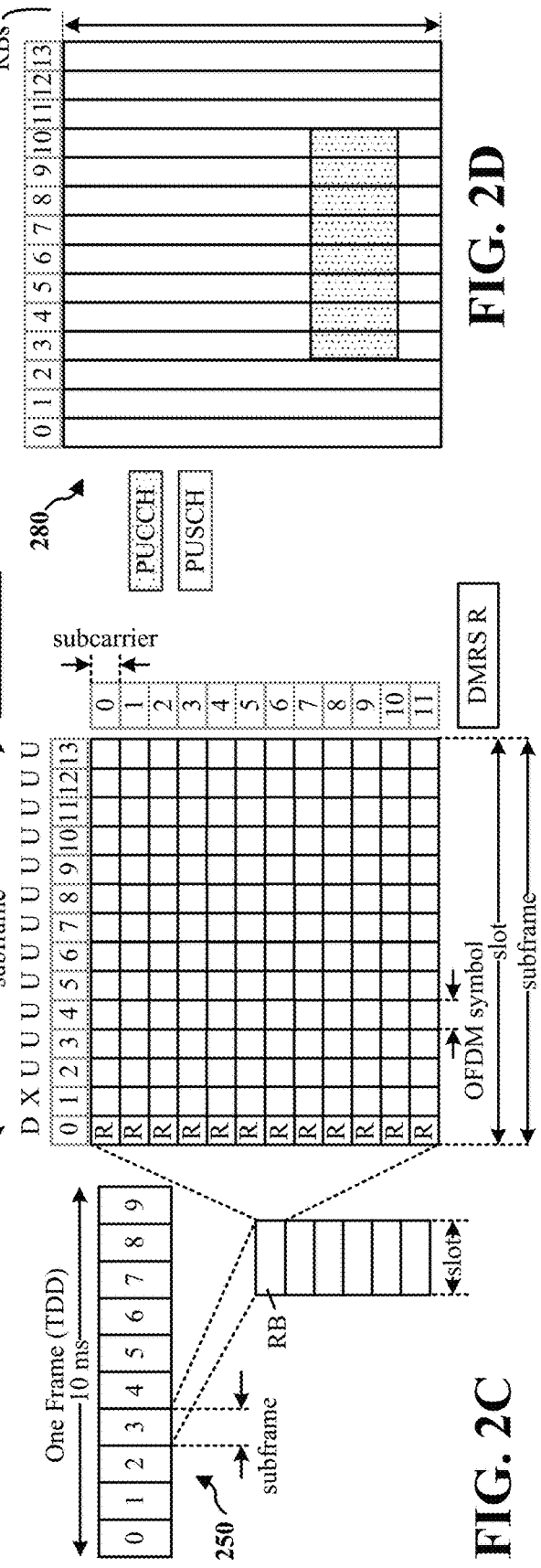
FIG. 2A
FIG. 2B
FIG. 2C
FIG. 2D

SYSTEM AND METHOD FOR POWER MANAGEMENT BASED ON SUBFRAME CONTENT

BACKGROUND

Technical Field

The present disclosure relates generally to communications systems, and more particularly, to a user equipment configured for power management based on the content of received subframes.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

For communication in a radio access or other wireless network, performance and functionality of a user equipment (UE) may be subject to some characteristics of the constituent components of the UE. Illustratively, the UE may include, inter alia, a modem or baseband chip, a radio frequency (RF) chip, and/or a power management integrated circuit (PMIC)—one or more of which may be implemented on the same chip or system on a chip (SoC). In addition, the UE may include various other components that are communicatively connected and/or integrated with at least one chip and/or SoC, such as Low-Power Double Data Rate (LPDDR) Synchronous Dynamic Random Access Memory (SDRAM) (e.g., LPDDR2).

Many of the aforementioned and other components of the UE may consume electrical energy and dissipate some energy as heat, e.g., as with fetching and executing instructions, transmitting and receiving signals, and/or other such UE operations. In the aggregate, the components may cause a non-negligible amount of heat to accumulate within the UE, and therefore may be exposed to the accumulated heat. Furthermore, environmental and/or other contextual factors may contribute to the ambient temperature(s) surrounding the components.

Some components may be particularly susceptible to relatively higher ambient temperatures. As one example, the modem SoC of the UE may cease functioning at relatively higher ambient temperatures—e.g., exposure to ambient temperatures of approximately 105 degrees)(° Celsius (C) and above may cause the modem SoC to shut down. Similarly, one or more other components of the UE may be less capable or entirely incapable of operating in relatively higher ambient temperatures.

In many contexts, and particularly in environments commensurate with increased ambient temperatures, power management may become significant, if not paramount, in UE operation, as failure to control and/or dissipate heat immediately surrounding some components may render the those components inoperable. When the UE is implemented in a vehicle, for example, the modem SoC may experience a baseline ambient temperature that is already elevated (e.g., an ambient temperature of approximately 85° C.). In view of the foregoing, UEs may benefit from the techniques and approaches for power management described in the present disclosure. Specifically, the present disclosure may present some solutions to power management for UEs configured for cellular vehicle-to-everything (CV2X) communication, such as UEs configured in vehicles.

In an aspect of the disclosure, a method, a computer-readable medium, and an apparatus are provided. The apparatus may be a UE configured to determine whether a first subframe includes at least one sub-channel carrying information intended for the UE, receive the information via at least one receive (Rx) chain associated with the at least one sub-channel when the information intended for the UE is carried on the at least one sub-channel included in the first subframe, and deactivate the at least one Rx chain associated with the at least one sub-channel based on whether the information intended for the UE is absent from the at least one sub-channel included in the first subframe.

The UE may be further configured to receive the first subframe, and determine whether the at least one sub-channel included in the first subframe further carries at least one demodulation reference signal (DMRS) associated with the information. The at least one sub-channel included in the first subframe is determined to carry the information intended for the UE when the at least one DMRS is determined to be carried on the at least one sub-channel, and the information intended for the UE is determined to be absent from the at least one sub-channel when the at least one DMRS is determined to be absent from the at least one sub-channel.

The UE may be further configured to determine each of a set of correlation values corresponding to a respective resource element (RE) of a set of REs allocated for the at least one DMRS based on receiving the first subframe via at least one antenna of the UE. Each of the set of REs may include a respective sub-channel of the at least one sub-channel over a symbol of a set of symbols included in the first subframe. The UE may be further configured to determine whether each of the set of correlation values satisfies a threshold value, and the at least one sub-channel included in the first subframe is determined to carry the at least one DMRS associated with the information based on whether at least one of the set of correlation values is determined to satisfy the threshold value. In one aspect, the at least one sub-channel is determined to carry the at least one DMRS when at least one of the set of correlation values satisfies the threshold value.

In one aspect, the deactivation of the at least one Rx chain associated with the at least one sub-channel based on whether the information intended for the UE is absent from the at least one sub-channel included in the first subframe includes to: deactivate each Rx chain that is associated with one of the at least one sub-channel of one of the set of REs corresponding to one of the set of correlation values determined to fail to satisfy the threshold value. Further, the reception of the information via the at least one Rx chain associated with the at least one sub-channel when the information intended for the UE is carried on the at least one sub-channel included in the first subframe includes to: receive the information via each other Rx chain that is associated with another one of the at least one sub-channel of another one of the set of REs corresponding to another one of the set of correlations value determined to satisfy the threshold value.

In one aspect, for each of the set of correlation values that is determined to satisfy the threshold value, the UE may be further configured to determine another correlation value corresponding to another RE allocated for the at least one DMRS based on receiving the first subframe via at least one antenna of the UE, and the other RE includes the respective sub-channel of the respective RE corresponding to one of the set of correlation values over another symbol of the set of symbols. The UE may be further configured to determine whether the other correlation value satisfies the threshold value, and the respective sub-channel of the respective RE is determined to carry the at least one DMRS associated with the information further based on whether the other correlation value is determined to satisfy the threshold value.

In one aspect, the at least one Rx chain is deactivated for one or more remaining symbols of the first subframe following a symbol of the first subframe in which the at least one DMRS is determined to be absent. In another aspect, the UE may be further configured to reactivate the at least one Rx chain at a beginning of a second subframe that consecutively follows the first subframe when the at least one Rx chain is deactivated. In a further aspect, the at least one sub-channel is included in a channel, the channel includes one of a physical sidelink control channel (PSCCH) or a physical sidelink shared channel (PSSCH), and the information intended for the UE comprises one of control information on the PSCCH or data on the PSSCH.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

DETAILED DESCRIPTION

Figure 1:
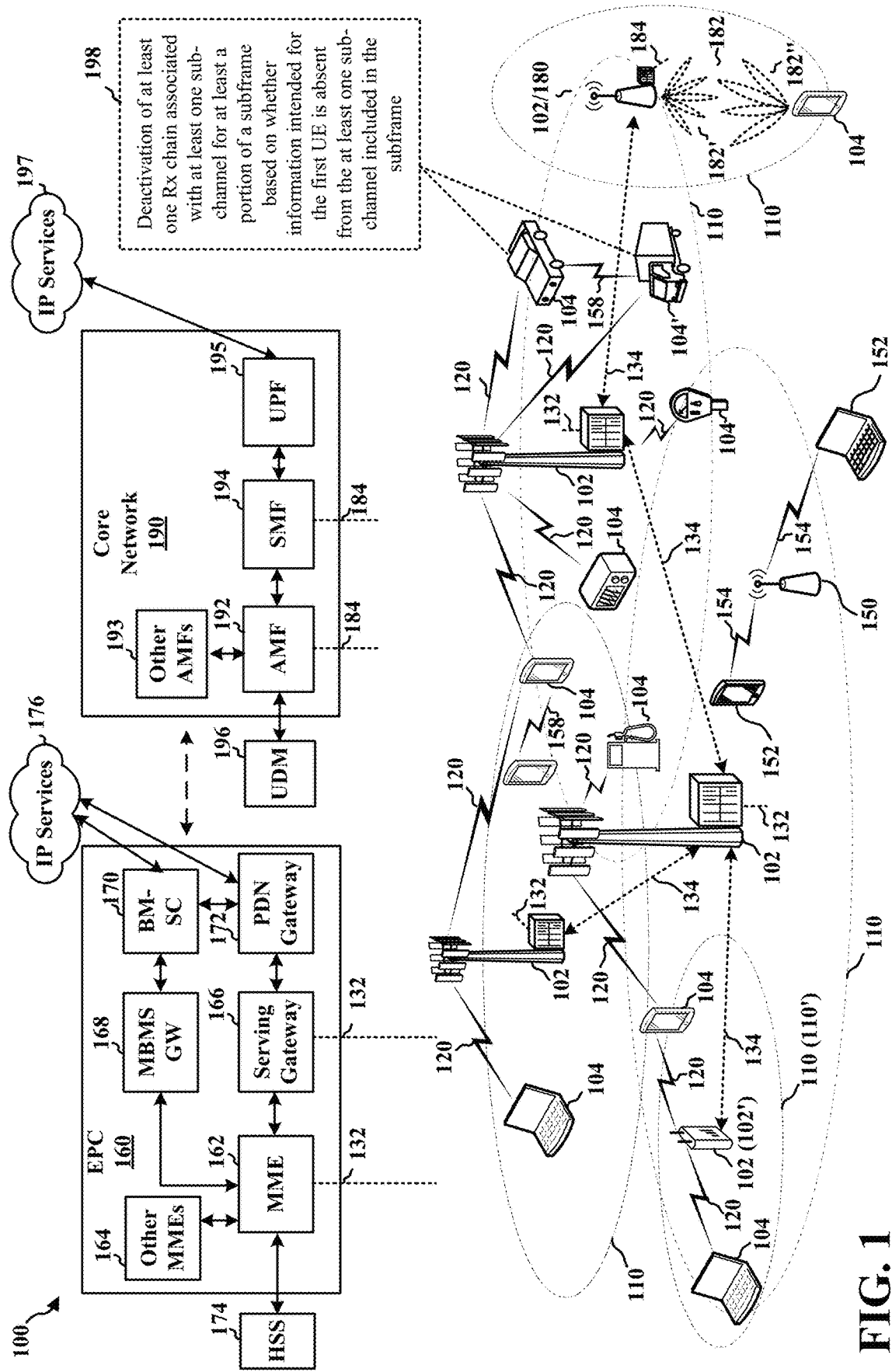
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunications systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example aspects, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G Long Term Evolution (LTE) (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G New Radio (NR) (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y megahertz (MHz) (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as Internet-of-Things (IoT) devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the present disclosure may focus on 5G NR, the concepts and various aspects described herein may be applicable to other similar areas, such as LTE, LTE-Advanced (LTE-A), Code Division Multiple Access (CDMA), Global System for Mobile communications (GSM), or other wireless/radio access technologies. Furthermore, the present disclosure may present cellular vehicle-to-everything (CV2X) communication as the context for a UE; however, the concepts and various aspects described herein may be applicable to other communication types and/or protocols, such as IoT, D2D, mMTC, URLLC, and other wireless/cellular communications.

Referring again to FIG. 1, in certain aspects, a first UE 104 may be connected or integrated with a vehicle, and therefore, may be configured for CV2X communication. Accordingly, the first UE 104 may be configured to communicate with a second UE 104', e.g., over a D2D communication link 158. In some aspects, the D2D communication link 158 may use a channel (e.g., PSSCH or PSCCH) that is divided into a set of sub-channels. Data and/or control information communicated over the D2D communication link 158 may be carried on some or all of the sub-channels.

In the illustrated aspect, the second UE 104' may transmit data and/or control information on the PSSCH and/or PSCCH, respectively, to the first UE 104 in a set of sub-frames. The data and/or control information may be carried on a set of sub-channels included in the PSSCH and/or PSCCH. The first UE 104 may be configured to receive the data and/or control information carried on the PSSCH and/or PSCCH, respectively, in the set of subframes.

The first UE 104 may include a set of receive (Rx) chains, each of which may be communicatively coupled with an antenna of the first UE 104. Each of the Rx chains may be associated with at least one of the sub-channels. Accordingly, when data and/or control information intended for the first UE 104 is carried on a sub-channel in a subframe, the first UE 104 may receive that data and/or control information via the associated one of the Rx chains of the first UE 104.

To that end, the first UE 104 may be configured to determine whether each of the set of subframes includes at least one sub-channel carrying data and/or control information intended for the first UE 104. In one aspect, the first UE 104 may be configured to determine whether the at least one sub-channel included in each of the set of subframes further carries at least one demodulation reference signal (DMRS) associated with the data and/or control information.

The first UE 104 may determine that the at least one sub-channel included in a respective one of the set of subframes carries data and/or control information intended for the first UE 104 when the at least one sub-channel in the respective subframe further carries at least one DMRS associated with the data and/or control information. Correspondingly, the first UE 104 may determine that data and/or control information intended for the first UE 104 is absent from the at least one sub-channel included in a respective one of the set of subframes when the at least one DMRS is absent from the at least one sub-channel included in the respective subframe.

Based on whether the first UE 104 determines that data and/or control information intended for the first UE 104 is absent from at least one sub-channel included in a subframe, the first UE 104 may be configured to deactivate at least one Rx chain for at least a portion of the subframe (198). In some aspects (e.g., of 198), the first UE 104 may be configured to deactivate all Rx chains for a portion of the subframe when the first UE 104 determines that none of sub-channels included in the subframe carries data and/or control information intended for the first UE 104. However, the UE 104 may refrain from deactivating any Rx chains if any of the sub-channels of the subframe carries data and/or control information intended for the first UE 104.

In some other aspects (e.g., of 198), the first UE 104 may be configured to deactivate the Rx chains associated with the sub-channels that do not carry any data and/or control information intended for the first UE 104. In such other aspects (e.g., of 198), however, the first UE 104 may refrain from deactivating other Rx chains associated with other sub-channels that do carry data and/or control information intended for the first UE 104. In other words, the first UE 104 may deactivate a subset of Rx chains for a portion of the subframe if data and/or control information intended for the first UE 104 is absent from each of the sub-channels associated with each of the subset of Rx chains.

The first UE 104 may be configured to reactivate each of the deactivated Rx chains at the beginning of the next subframe. That is, the first UE 104 may deactivate one or more Rx chains on a subframe-by-subframe basis, depending upon whether one or more sub-channels carries data and/or control information intended for the first UE 104. Further, the first UE 104 may reactivate each of the one or more deactivated Rx chains at the beginning of the next subframe to determine whether one or more of the sub-channels carries data and/or control information intended for the first UE 104 so that the first UE 104 may again determine whether to deactivate one or more Rx chains.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 milliseconds (ms)) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies µ. 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology µ, there are 14 symbols/slot and $2^\mu$ slots/subframe. The subcarrier spacing and symbol length/duration are a function of the numerology. The subcarrier spacing may be equal to $2^\mu *15$ kilohertz (kHz), where µ is the numerology 0 to 5. As such, the numerology µ=0 has a subcarrier spacing of 15 kHz and the numerology µ=5 has a subcarrier spacing of 480 kHz. The symbol length/duration is inversely related to the subcarrier spacing. FIGS. 2A-2D provide an example of slot configuration 0 with 14 symbols per slot and numerology µ=0 with 1 slot per subframe. The subcarrier spacing is 15 kHz and symbol duration is approximately 66.7 µs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include DMRS (indicated as $R_x$ for one particular configuration, where 100× is the port number, but other DMRS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DMRS (indicated as R for one particular configuration, but other DMRS configurations are possible) for channel estimation at the base station. The UE may transmit DMRS for the physical uplink control channel (PUCCH) and DMRS for the physical uplink shared channel (PUSCH). The PUSCH DMRS may be transmitted in the first one or two symbols of the PUSCH. The PUCCH DMRS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 2E:
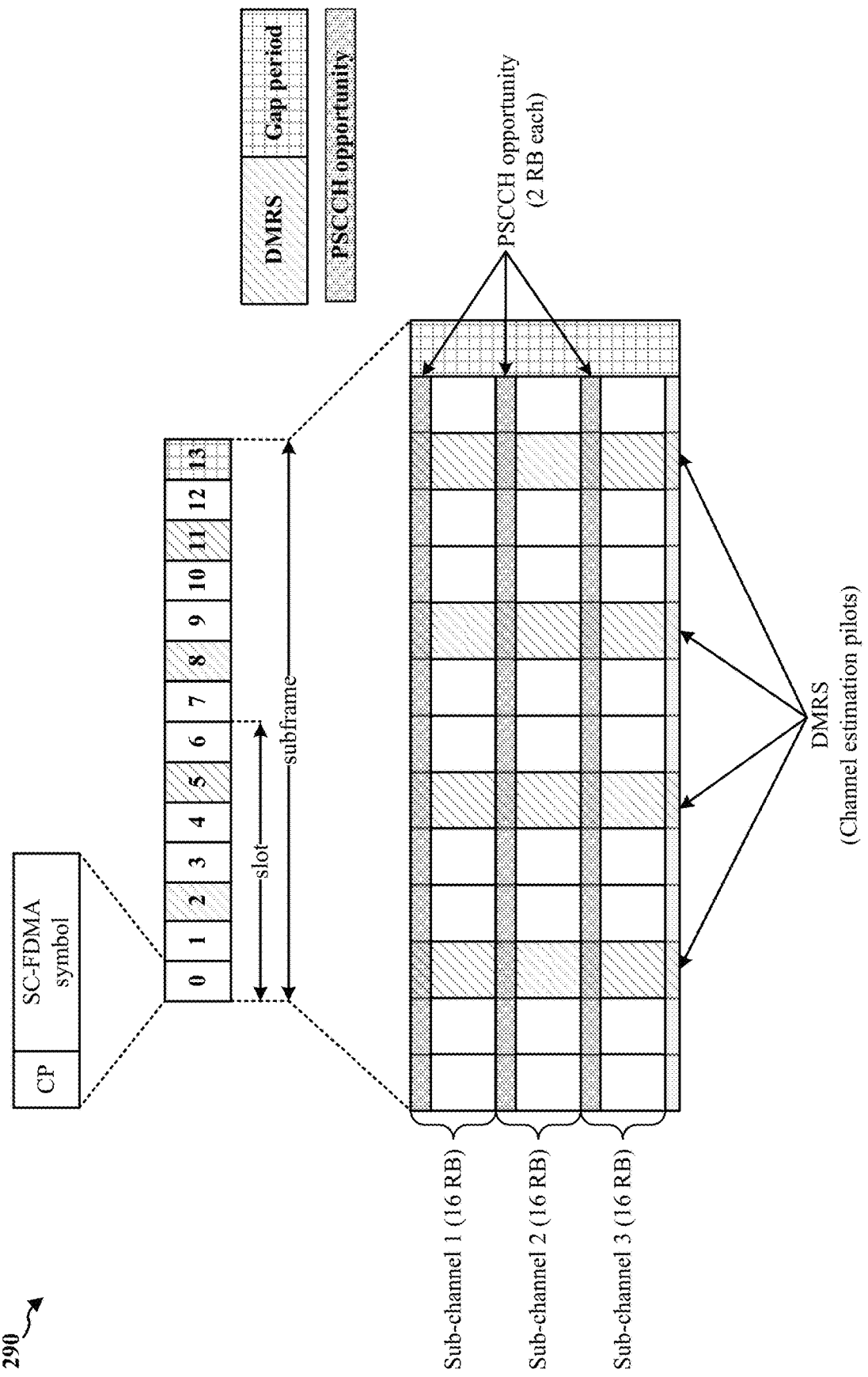
FIG. 2E is a diagram illustrating an example of a cellular vehicle-to-everything (CV2X) subframe.

FIG. 2E is a diagram 290 that illustrates one example aspect of a subframe configured for CV2X communication. For example, the subframe may be a sidelink subframe having a duration of 1 ms. In some aspects, each subframe may include fourteen transmission time intervals (TTIs). In some further aspects, each subframe may include two slots of seven TTIs each. However, different configurations may be possible, for example, based on different numerologies. Within each TTI of the subframe, a CP may be followed by a single-carrier frequency division multiple access (SC-FDMA) symbol. However, the last TTI may be configured as gap or guard period, which may allow switching between transmission and reception.

In the illustrated example, a subset of the RBs may carry DMRSs, e.g., for channel estimation at another UE configured for CV2X communication. With CV2X communication, DMRS extension may be configured to address relatively greater Doppler shifts. Each DMRS may be carried on all or some of the available sub-channels over the TTIs configured to carry a DMRS. According to one configuration, four DMRSs may be included in the subframe: the first DMRS in the third TTI (e.g., symbol index 2), the second DMRS in the sixth TTI (e.g., symbol index 5), the third DMRS in the ninth TTI (e.g., symbol index 8), and the fourth DMRS in the twelfth TTI (e.g., symbol index 11). However, other DMRS configurations may be possible.

The subframe may be divided into a set of sub-channels, each of which may be sixteen RBs. While three sub-channels are illustrated in the diagram 290, different numbers of sub-channels, potentially spanning different numbers of RBs, may be possible in other configurations. In each sub-channel over each TTI, a PSCCH opportunity may occur—for example, the PSCCH may be carried on two RBs of each sub-channel over each TTI. RBs that are not allocated for the DMRS or the gap period, and that do not carry the PSCCH, may carry data. The data may be on a PSSCH or other sidelink channel.

Figure 3:
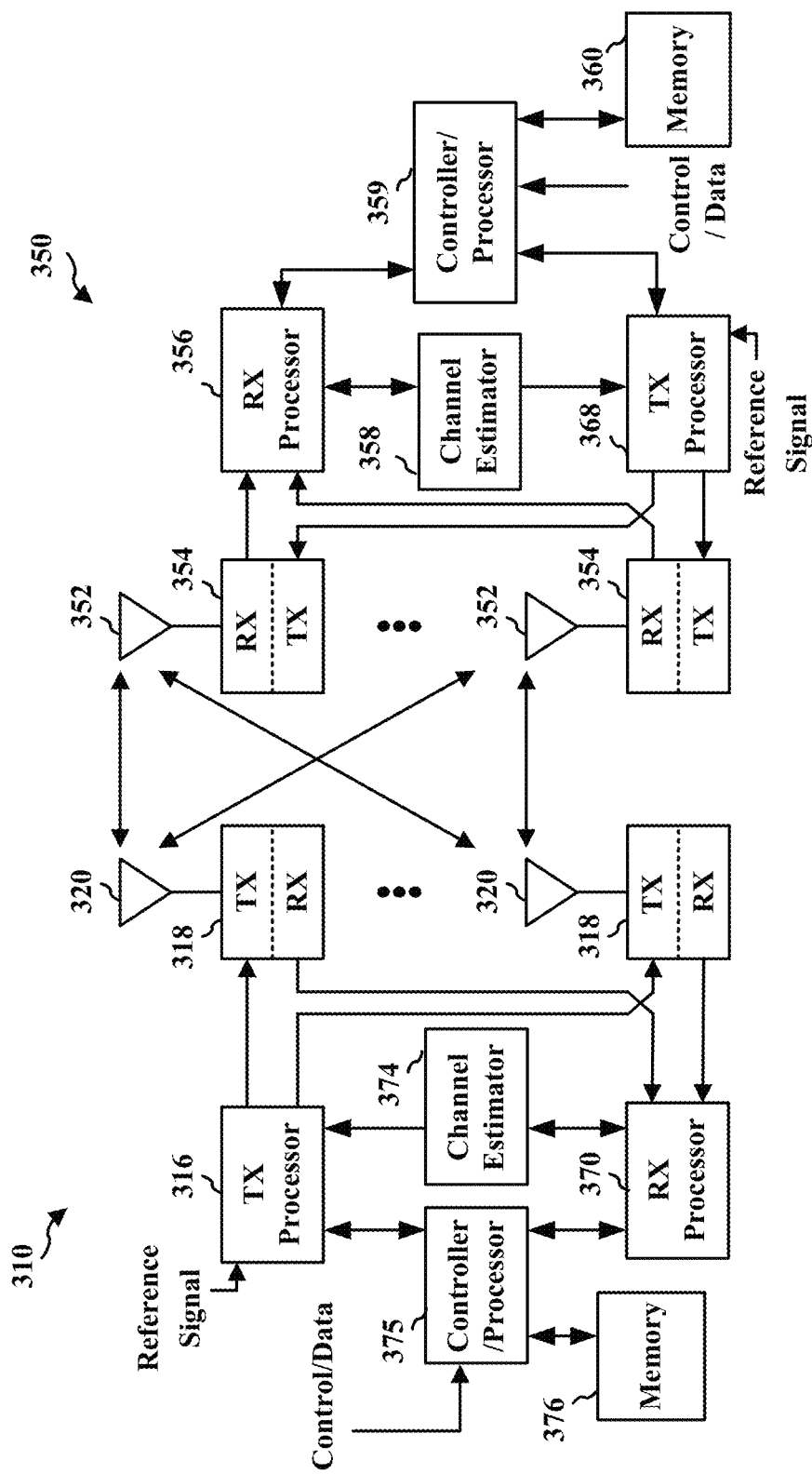
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with (198) of FIG. 1.

For communication in a radio access or other wireless network, performance and functionality of a UE may be subject to some characteristics of the constituent components of the UE. Illustratively, the UE may include, inter alia, a modem or baseband chip, a radio frequency (RF) chip, and/or a power management integrated circuit (PMIC)—one or more of which may be implemented on the same chip or SoC. In addition, the UE may include various other components that are communicatively connected and/or integrated with at least one chip and/or SoC, such as Low-Power Double Data Rate (LPDDR) Synchronous Dynamic Random Access Memory (SDRAM) (e.g., LPDDR2).

Figure 4:
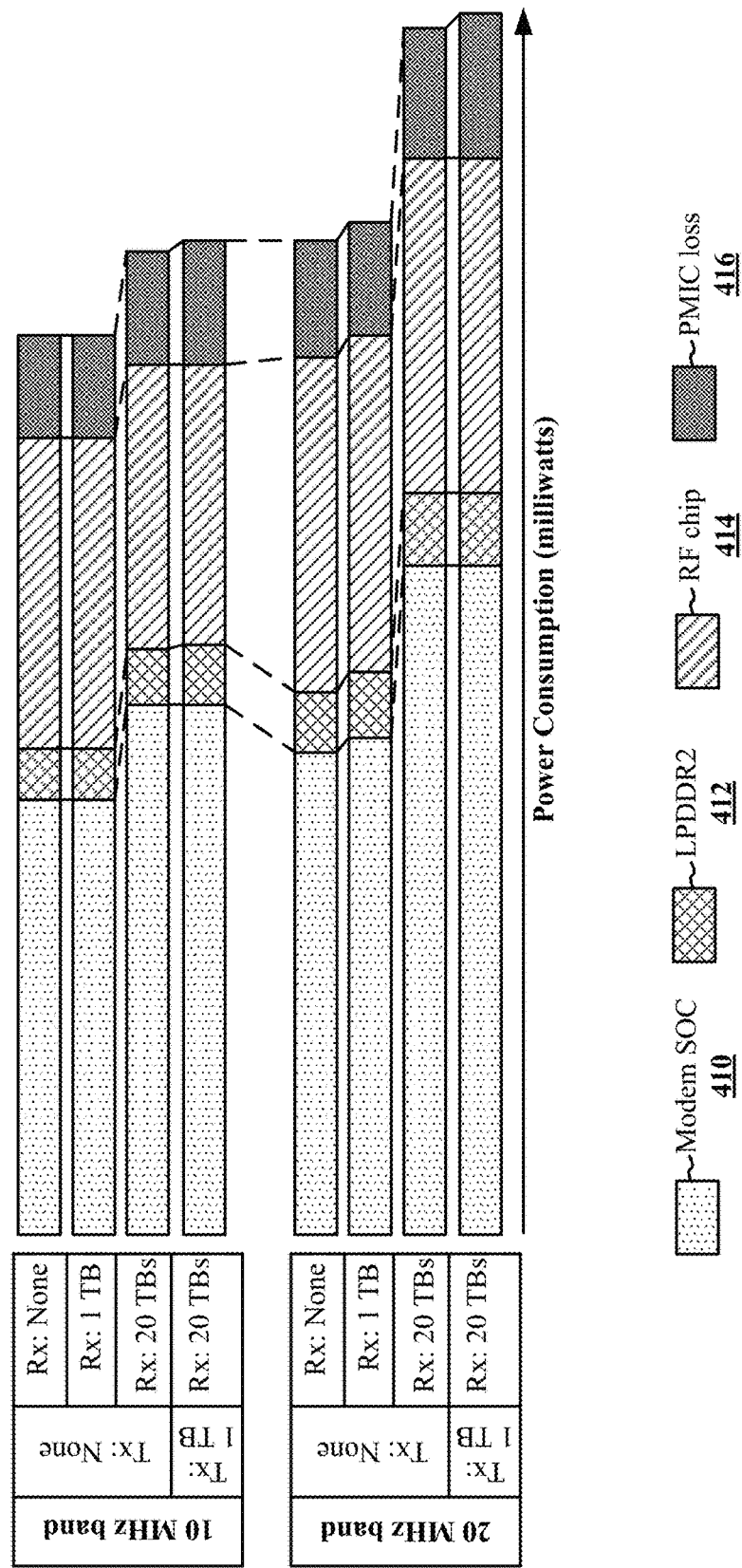
FIG. 4 is a diagram illustrating example power consumption by a UE.

Referring to FIG. 4, the power consumption 400 of a set of example components of a UE is illustrated. Many of the aforementioned and other components of the UE may consume electrical energy and dissipate some energy as heat, e.g., as with fetching and executing instructions, transmitting and receiving signals, and/or other such UE operations. In the aggregate, the components may cause a non-negligible amount of heat to accumulate within the UE, and therefore may be exposed to the accumulated heat.

For example, the power consumption 400 illustrated in FIG. 4 illustrates example power consumptions commensurate with a modem SoC, an LPDDR2 memory, an RF chip, and PMIC loss in example CV2X bands of 10 MHz and 20 MHz: (1) Tx: none/Rx: none indicates no transmission or reception (although the CV2X components may be functioning correctly); (2) Tx: none/Rx: 1 TB indicates no transmission with relatively low reception activity (e.g., 1 TB reception); (3) Tx: none/Rx: 20 TBs indicates no transmission with relatively high reception activity (e.g., 20 TBs reception); and Tx: 1 TB/Rx: 20 TBs indicates relatively low transmission activity (e.g., 1 TB transmission) with relatively high reception activity (e.g., 20 TBs reception).

As illustrated in the example power consumption 400, the modem SoC power 410 and RF chip power 414 may be relatively (and appreciably) significant. Conversely, the LPDDR2 (or other memory) power 412 and the PMIC loss power 416 may be less significant—e.g., each of the LPDDR2 (or other memory) power 412 and the PMIC loss power 416 may be a fraction of each of the modem SoC power 410 and RF chip power 414. Therefore, the modem SoC power and RF chip power may cause a greater increase than the LPDDR2 (or other memory) and PMIC loss with respect to the ambient temperatures surrounding various components of a UE.

Some components may be particularly susceptible to relatively higher ambient temperatures. As one example, the modem SoC of the UE may cease functioning at relatively higher ambient temperatures—e.g., exposure to ambient temperatures of approximately 105 degrees)(° Celsius (C) and above may cause the modem SoC to shut down. Similarly, one or more other components of the UE may be less capable or entirely incapable of operating in relatively higher ambient temperatures.

In many contexts, and particularly in environments commensurate with increased ambient temperatures, power management may become significant, if not paramount, in UE operation, as failure to control and/or dissipate heat immediately surrounding some components may render the those components inoperable. When the UE is implemented in a vehicle, for example, the modem SoC may experience a baseline ambient temperature that is already elevated (e.g., an ambient temperature of approximately 85° C.).

As illustrated with respect to FIG. 4, the modem SoC and RF chip of a UE may contribute more significantly to ambient temperatures due to their relatively greater power consumptions 410, 414. Therefore, a UE may benefit from the techniques and approaches for power management related to one or more of the modem SoC and/or the RF chip. FIGS. 5-12 may present some solutions to power management for UEs configured for CV2X communication, such as UEs configured in vehicles, by reducing the power consumption of RF chips in such UEs. Commensurate with the reduced power consumption, the ambient temperatures within UEs may be reduced, thereby preventing damage to and/or poor performance by various UE components caused by increased ambient temperatures.

Figure 5:
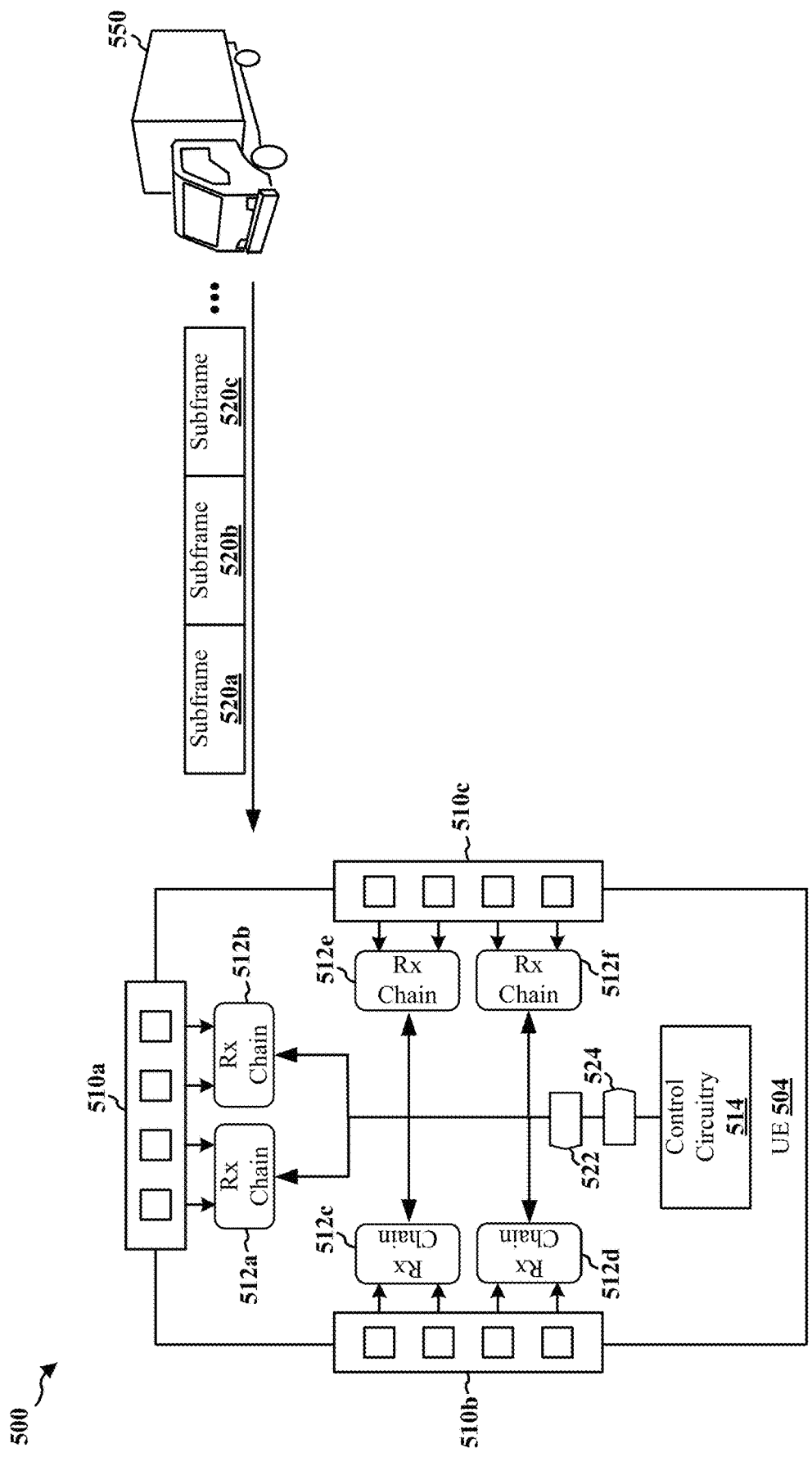
FIG. 5 is a diagram of CV2X communication by two UEs.

With respect to FIG. 5, a block diagram illustrates an example wireless communications system 500, such as a CV2X network. In the example wireless communications system 500, a first UE 504 may communicate with a second UE 550, e.g., according to CV2X communication. In some aspects, each of the UEs 504, 550 may be configured to communicate in a 5G NR network and/or a Frequency Regime 2 (FR2) network, such as a mmWave and/or near-mmWave network that may occupy a frequency spectrum that begins at approximately 30 GHz, although the frequency spectrum may begin at 24 GHz in practice. According to various aspects, the first UE 504 may be implemented as the first UE 104 of FIG. 1 and/or the UE 350 of FIG. 3.

For communication in the wireless communications system 500, the first UE 504 may include a set of antenna modules 510a-c (also referred to as antenna panels). For example, each of the antenna modules 510a-c may be a dual-polarization patch antenna, and one or more of the antenna modules 510a-c may include dipoles distributed thereon. Other antenna structures may also be used within the antenna modules 510a-c, such as slotted waveguides, Yagi antennas, lens antennas, etc.

Each of the antenna modules 510a-c may include a respective set of antenna elements. Through a respective one of the antenna modules 510a-c, each of the antenna elements may be communicatively connected with at least one of the Rx chains 512a-f. Each of the Rx chains 512a-f may provide a communication path between each of an analog beamforming component and a digital beamforming components. Each of the Rx chains 512a-f may support one independent data stream, which may be carried on one sub-channel. To do so, each of the Rx chains 512a-f may include one or more of an analog-to-digital converter (ADC), a mixer, a downconverter, and/or one or more other RF and/or beamforming components. In some aspects, each of the Rx chains 512a-f may be included in an RF chip.

The first UE 504 may further include control circuitry 514, which may be communicatively connected with each of the Rx chains 512a-f. In some aspects, the control circuitry 514 may be implemented as a modem chip. The control circuitry 514 may be configured to individually control each of the Rx chains 512a-f. For example, the control circuitry 514 may be configured to send a deactivation instruction 522 to one or more of the Rx chains 512a-f and, further, may be configured to send an activation instruction 524 to one or more deactivated Rx chains 512a-f.

When one or more of the Rx chains 512a-f is deactivated, the deactivated one of the Rx chains 512a-f may no longer detect for and receive signaling over the air. For example, one of the Rx chains 512a-f may be deactivated by being switched off and/or by reducing the power supplied to the deactivated one of the Rx chains 512a-f. In so doing, the energy dissipated as heat may be reduced, e.g., because the RF chip including the deactivated one of the Rx chains 512a-f may consume less power. In effect, the ambient temperature within the first UE 504 may be reduced by deactivating one or more of the Rx chains 512a-f.

When one or more of the Rx chains 512a-f is activated (or active), the activated one of the Rx chains 512a-f may detect for and receive signaling over the air. The control circuitry 514 may be configured to activate and deactivate each of the Rx chains 512a-f on a partial subframe by partial subframe basis. For example, the control circuitry 514 may be configured to deactivate one or more of the Rx chains 512a-f during a subset of the set of symbols during a subframe, and may be configured to activate one or more of the Rx chains 512a-f at the beginning of the next subframe. While the control circuitry 514 may deactivate one or more of the Rx chains 512a-f for a relatively short duration (e.g., less than 1 ms), this Rx chain deactivation may nonetheless mitigate heat dissipated within the first UE 504.

The mitigation of dissipated heat through Rx chain deactivation may be particularly significant in scenarios in which the first UE 504 infrequently receives over-the-air signaling, such as when the first UE 504 is traveling through areas of lower populations and/or traveling on roadways with lower vehicle densities. Moreover, the aggregate effect of deactivating one or more Rx chains 512a-f may appreciably reduce the ambient temperature within the first UE 504 and/or prevent the ambient temperature from reaching levels at which potentially deleterious effects may occur.

The first UE 504 may be configured to deactivate one or more of the Rx chains 512a-f for at least a portion of a subframe based on whether one or more corresponding sub-channels included in the subframe carry data and/or control information (collectively, "information") intended for the first UE 504. Illustratively, the second UE 550 may be configured to transmit a set of subframes 520a-c to the first UE 504. In some aspects, the second UE 550 may transmit the set of subframes 520a-c to the first UE 504 according to CV2X communication. For example, each of the first UE 504 and the second UE 550 may be a vehicle, and the two vehicles may be relatively proximate to one another while traveling along a road. One or more of the subframes 520a-c may carry information associated with vehicles and/or roadways, such as location information, emergency information, hazard information, and so forth.

Figure 6:
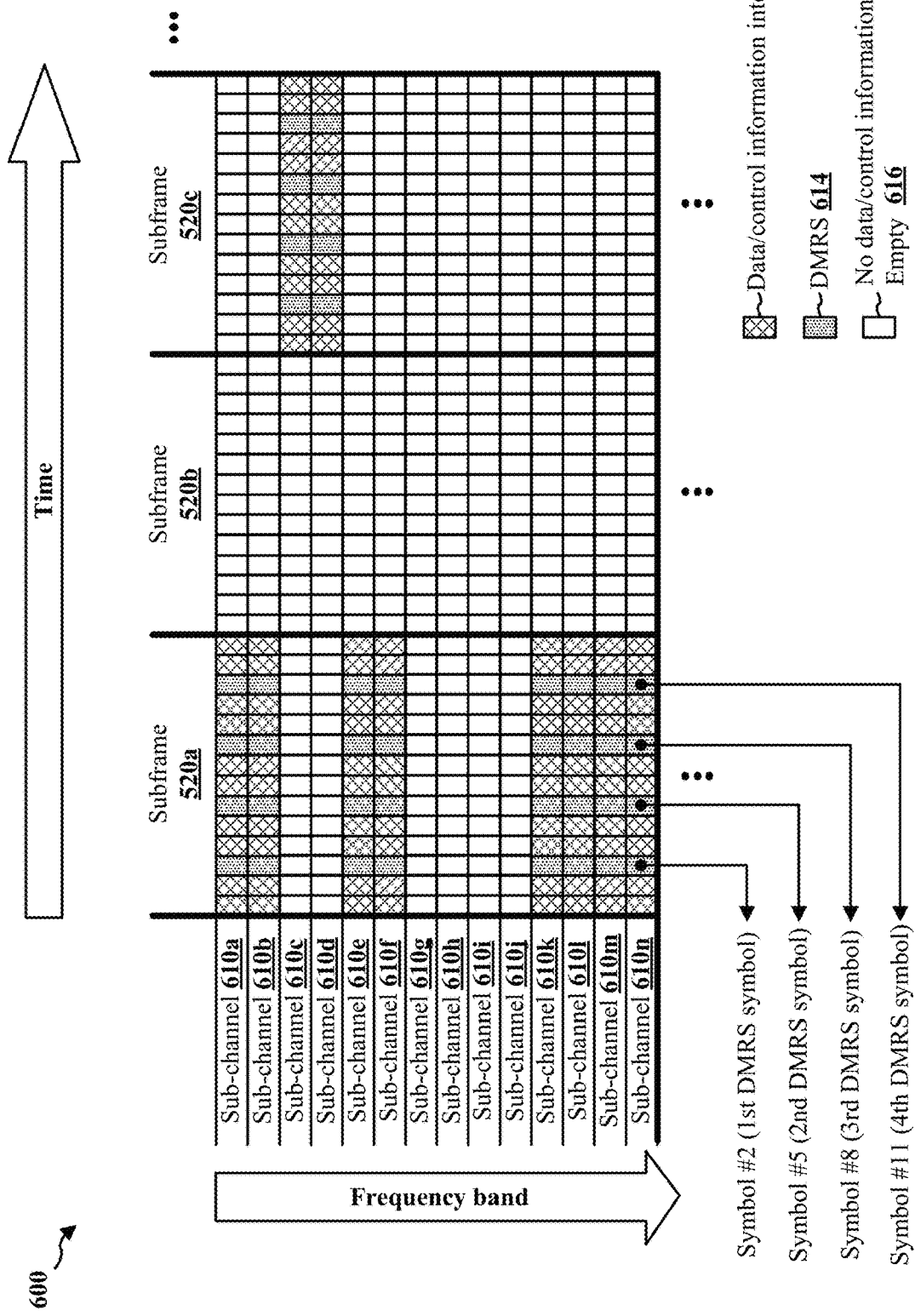
FIG. 6 is a diagram of a set of subframes configured for CV2X communication.

FIG. 6 illustrates an example of the set of subframes 520a-c, which may be transmitted from the second UE 550 to the first UE 504. In the time domain, each of the subframes 520a-c may have a respective duration of 1 ms and may respectively include 14 symbols, which may be indexed 0 through 13. In the frequency domain, each of the subframes 520a-c may include a set of sub-channels 610a-n. For example, each of the sub-channels may be 180 kHz (although other configurations are possible) and may be included in data and/or control channel, such as a PSSCH and/or a PSCCH. Each of the Rx chains 512a-f of the first UE 504 may support one independent data stream, which may be carried on one sub-channel 610a-n. (n.b., the number of Rx chains 512a-f is shown as asymmetric or unequal to the number of sub-channels 610a-n for illustrative purposes; in various configurations, however, the number of sub-channels and the number of Rx chains may be symmetric or equal.)

As each of the subframes 520a-c is received, the first UE 504, and specifically the control circuitry 514, may be configured to determine whether a respective one of the received subframes 520a-c includes at least one of the sub-channels 610a-n carrying information (e.g., data and/or control information) intended for the first UE 504. When the control circuitry 514 determines that information 612 intended for the first UE 504 is carried on one or more of the sub-channel 610a-n included in the respective one of the received subframes 520a-c, the information 612 intended for the first UE 504 may be received via the one or more Rx chains 512a-f corresponding to the one or more of the sub-channels 610a-n carrying the information 612.

However, the control circuitry 514 may deactivate one or more of the Rx chains 512a-f based on whether the control circuitry 514 determines that information intended for the first UE 504 is absent from one or more of the sub-channels 610a-n included in the respective one of the received subframes 520a-c. In a first configuration, the control circuitry 514 may deactivate, for at least a portion of the respective one of the received subframes 520a-c, every Rx chain 512a-f corresponding to every sub-channel 610a-n when the information 612 intended for the first UE 504 is absent from every sub-channel 610a-n. In other words, if all of the RBs of the respective one of the received subframes 520a-c are empty 616 (e.g., an empty RB may include an RB that carries no information intended for the first UE 504), then the control circuitry 514 may deactivate all Rx chains 512a-f. Thus, according to this first configuration, the control circuitry 514 may activate or refrain from deactivating all of the Rx chains 512a-f if any of the sub-channels 610a-n carries information 612 intended for the first UE 504.

In an alternative configuration, the control circuitry 514 may selectively deactivate, for at least a portion of the respective one of the received subframes 520a-c, each of the Rx chains 512a-f associated with each of the sub-channels 610a-n that are empty 616—that is, a subset of the Rx chains 512a-f may be deactivated when the information 612 intended for the first UE 504 is absent from the associated subset of the sub-channels 610a-n. Correspondingly, the control circuitry 514 may activate or refrain from deactivating each of the Rx chains 512a-f associated with each of the sub-channels 610a-n that carries information 612 intended for the first UE 504. Thus, according to this alternative configuration, some, all, or none of the Rx chains 512a-f may remain active for each of the subframes 520a-c, as opposed to the foregoing first configuration in which all or none of the Rx chains 512a-f may remain active for each of the subframes 520a-c.

According to various aspects, the control circuitry 514 may determine whether a respective one of the sub-channels 610a-n carries information 612 intended for the first UE 504 when at least one DMRS 614 is carried on the respective one of the sub-channels 610a-n. For example, referring to the first subframe 520a, the second UE 550 may include a DMRS 614 in one or more of symbols 2, 5, 8, and/or 11 on a first subset of sub-channels 610a, 610b, 610e, 610f, 610k, 610l, 610m, 610n when the second UE 550 includes information on the first subset of sub-channels 610a, 610b, 610e, 610f, 610k, 610l, 610m, 610n, and the control circuitry 514 may determine that the first subset of sub-channels 610a, 610b, 610e, 610f, 610k, 610l, 610m, 610n carries information 612 intended for the first UE 504 when the first UE 504 detects at least one DMRS 614 on each of the first subset of sub-channels 610a, 610b, 610e, 610f, 610k, 610l, 610m, 610n. Thus, the control circuitry 514 may determine that each of a second subset of sub-channels 610c, 610d, 610g, 610h, 610i, 610j, is empty 616 when the control circuitry 514 determines that a DMRS 614 is absent from each of symbols 2, 5, 8, and 11 on the second subset of sub-channels 610c, 610d, 610g, 610h, 610i, 610j.

In order to determine whether a respective one of the sub-channels 610a-n of a respective one of the subframes 520a-c carries a DMRS 614, the control circuitry 514 of the first UE 504 may be configured to determine each of a set of correlation values corresponding to a respective RE of a set of REs allocated for at least one DMRS 614 based on receiving the respective one of the subframes 520a-c via at least one of the antenna modules 510a-c of the first UE 504. An RE may include one of the sub-channels 610a-n over one of the symbols included in one of the subframes 520a-c. In the aforementioned example configuration, for each one of the subframes 520a-c, a DMRS 614 is located at the symbols indexed 2, 5, 8, and 11 on the ones of the sub-channels 610a-n that carry information 612 intended for the first UE 504. However, other DMRS configurations are possible— e.g., including more or fewer DMRSs at the same or different symbols of sub-channels.

Each DMRS 614 may be based on a predetermined sequence (e.g., a pilot sequence) and, therefore, the control circuitry 514 may be configured to perform DMRS correlation to determine if a DMRS 614 is located at a symbol of one of the sub-channels 610a-n. Furthermore, the control circuitry 514 may be configured to determine whether one of the sub-channels 610a-n carries information 612 intended for the first UE 504 by performing DMRS correlation with the received signal on one or more of the DMRS symbols in time, and comparing each of the correlation values with a threshold value.

If the control circuitry 514 determines that a correlation value corresponding to a respective one of the sub-channels 610a-n satisfies (e.g., meets and/or exceeds) the threshold values, then the control circuitry 514 may determine that the respective one of the sub-channels 610a-n carries a DMRS 614. Correspondingly, if the control circuitry 514 determines that a correlation value corresponding to a respective one of the sub-channels 610a-n fails to satisfy (e.g., is less than) the threshold value, then the control circuitry 514 may determine that a DMRS 614 is absent from the respective one of the sub-channels 610a-n.

The control circuitry 514 may perform DMRS correlation for a given signal $y_{a,l}$ corresponding to one of the subframes 520a-c based on the (known) DMRS sequence $s_{a,l}$ in the time domain for the given signal $y_{a,l}$ and the coarse noise variance $\hat{\sigma}_a^2$ from one of the antenna modules 510a-c a at DMRS symbol 1. The control circuitry 514 may align the DMRS sequence in the time domain based on a timing offset estimation $\widehat{n_0}$ that is calculated according to Equation 1:

$$\widetilde{s_{a,l}}[n] = s_{a,l}[n - \widehat{n_0}]$$ (Equation 1)

According to Equation 1, n is a time sample and $\hat{n}_0$ is the peak channel impulse response (CIR) after correlation, which may indicate the start time of the symbol. The control circuitry 514 may calculate the correlation per antenna a and on one or more DMRS symbols M over the total number of samples per symbol $N_{FFT}$ in the configuration of subframes 520a-c according to Equation 2:

$$\hat{R} = \sum_{a=0}^{1} \frac{1}{\sqrt{\hat{\sigma}_a^2}} \left| \sum_{l=0}^{M} \sum_{n=0}^{N_{FFT}-1} (y_{a,l}[n] \cdot conj(\widetilde{S_{a,l}}[n])) \right|^2 \quad \text{(Equation 2)}$$

According to Equation 2, M is the latest DMRS occurrence upon which DMRS correlation is to be performed beginning with 0. For example, if M is equal to 0, then the control circuitry 514 may only perform DMRS correlation on the first symbol allocated for a DMRS 614. Illustratively, for M=0 then DMRS correlation may be performed at symbol 2, which is the first DMRS occurrence in the configuration of subframes 520a-c, whereas for M=3 then DMRS correlation may be performed across symbols 2, 5, 8, and 11, with 11 being the fourth DMRS occurrence. A lower value of for M may allow the control circuitry 514 to deactivate a corresponding one of the Rx chains 512a-f more quickly, which may reduce power consumption at an earlier point, whereas a higher value for M may allow the control circuitry 514 to make a more accurate estimation as to whether a DMRS 614 is carried in one of the sub-channels 610a-n.

As information 612 intended for the first UE 504 may be carried in a subset of the sub-channels 610a-n, the control circuitry 514 may determine at least one correlation value $\hat{R}$ for each of the sub-channels 610a-n. The control circuitry 514 may determine that an RE of one of the subframes 520a-c carries a DMRS 614 if the correlation value $\hat{R}$ for that RE satisfies (e.g., is greater than or equal to) the threshold value. Similarly, the control circuitry 514 may determine that an RE of one of the subframes 520a-c does not carry a DMRS 614 if the correlation value $\hat{R}$ for that RE fails to satisfy (e.g., is less than) the threshold value.

Figure 10:
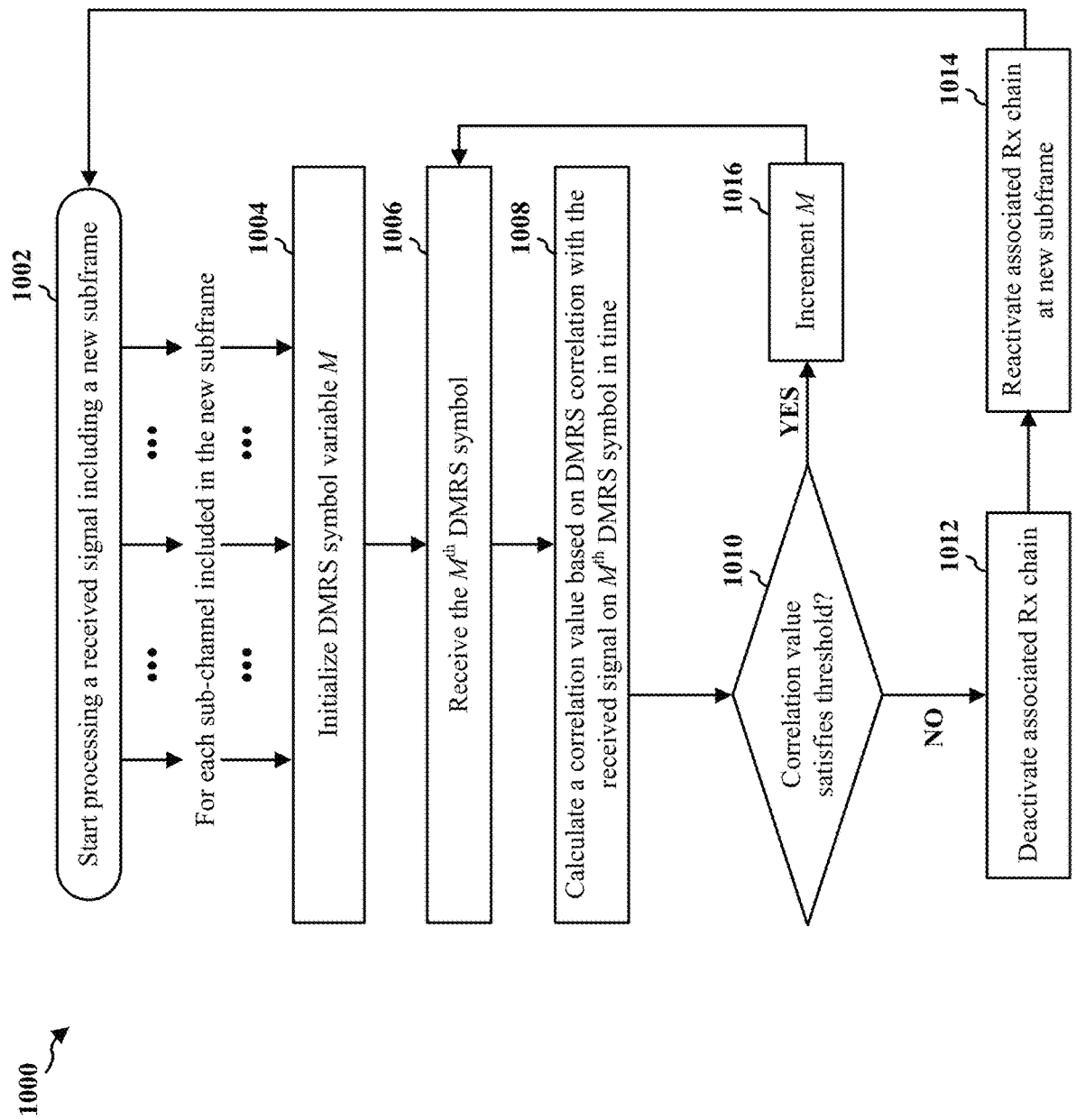
FIG. 10 is a flowchart of a method of wireless communication by a UE.

In one aspect, the control circuitry 514 may perform DMRS correlation across one or more additional symbols of a respective one of the sub-channels 610a-n if the control circuitry 514 determines that an earlier symbol of the respective one of the sub-channels 610a-n carries a DMRS 614 (see, e.g., FIG. 10, infra). That is, the control circuitry 514 may be configured to confirm that a respective one of the sub-channels 610a-n carries a DMRS 614 if the control circuitry 514 estimates that the respective sub-channel carries that DMRS 614 at an earlier symbol (e.g., if $\hat{R} \geq$ threshold value).

To do so, the control circuitry 514 may determine, for each of the sub-channels at which a DMRS 614 is determined to be located, another correlation value corresponding to another RE allocated for another DMRS based on receiving a respective one of the subframes 520a-c via at least one of the antenna modules 510a-c of the first UE 504, e.g., as shown in Equation 2. The control circuitry 514 may then compare the other correlation value to the threshold value.

If the other correlation value does not satisfy the threshold value, then the control circuitry 514 may determine that the corresponding one of the sub-channels 610a-n does not carry a DMRS (and the associated one of the Rx chains 512a-f may be deactivated). However, if the other correlation value does satisfy the threshold value, then the control circuitry 514 may estimate that the corresponding one of the sub-channels 610a-n carries a DMRS (and the associated one of the Rx chains 512a-f may remain active while information 612 intended for the first UE 504 is received).

Figure 7:
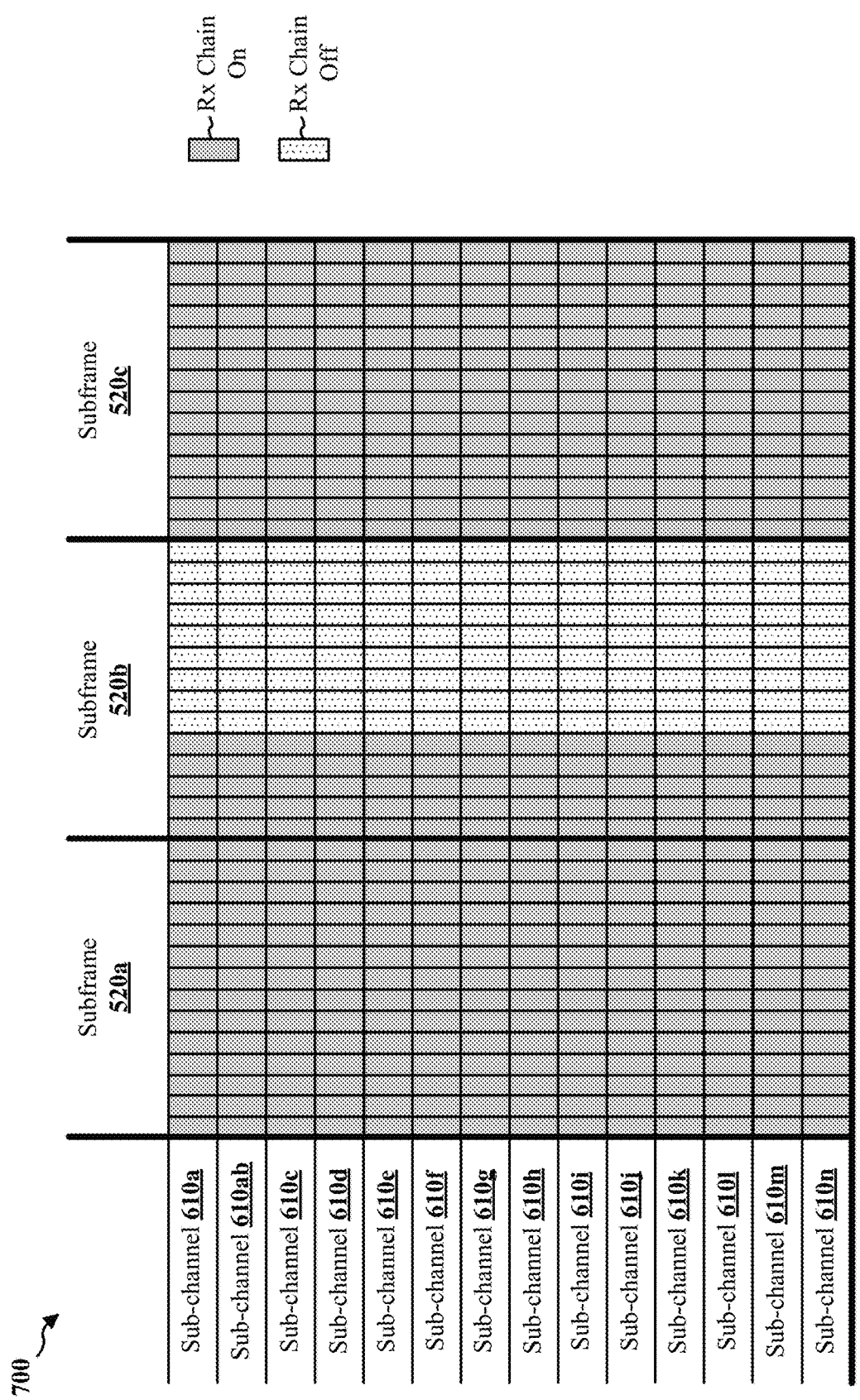
FIG. 7 is a diagram of one example of activated and deactivated receive (Rx) chains over a set of subframes.

Referring now to FIG. 7, a block diagram illustrates example Rx chain configurations 700 across the set of subframes 520a-c for the first configuration of the control circuitry 514. According to the aforementioned first configuration, the control circuitry 514 may refrain from deactivating any Rx chains 512a-f if any of the sub-channels 610a-n carries information 612 intended for the first UE 504, and therefore, the control circuitry 514 may deactivate all of the Rx chains 512a-f if the information 612 intended for the first UE 504 is absent from all of the sub-channels 610a-n.

Beginning first with the first subframe 520a, each of the Rx chains 512a-f may be active and may each receive an associated one of the sub-channels 610a-n. Each of the Rx chains 512a-f may remain active at least until the first symbol allocated for a DMRS 614. For each of the sub-channels 610a-n, the control circuitry 514 may perform DMRS correlation at the first symbol allocated for a DMRS 614 (e.g., symbol 2).

According to the illustrated example, the control circuitry 514 may determine that each of the first subset of the sub-channels 610a, 610b, 610e, 610f, 610k, 610l, 610m, 610n carries a DMRS 614 indicating the inclusion of information 612 intended for the first UE 504 based on the DMRS correlation. Therefore, according to the first configuration, the control circuitry 514 may refrain from deactivating any of the Rx chains 512a-f, even though the control circuitry 514 may determine that each of the second subset of the sub-channels 610c, 610d, 610g, 610h, 610i, 610j, does not carry a DMRS 614 (e.g., indicating REs of the second subset are empty 616).

When subsequently receiving the second subframe 520b, each of the Rx chains 512a-f may be active initially, and may remain active at least until the first symbol allocated for a DMRS 614. Again, the control circuitry 514 may perform DMRS correlation at the first symbol allocated for a DMRS 614 (e.g., symbol 2) for each of the sub-channels 610a-n. However, the control circuitry 514 may determine that none of the sub-channels 610a-n of the second subframe 520b carries a DMRS 614. Therefore, the control circuitry 514 may deactivate all of the Rx chains 512a-f at a later symbol following the symbol at which DMRS correlation fails. For example, the control circuitry 514 may deactivate all of the Rx chains 512a-f at symbol 4 so that all of the Rx chains 512a-f are deactivated from symbols 5 through 13 when each correlation value determined for each of the sub-channels 610a-n fails to satisfy the threshold value at the first symbol potentially carrying a DMRS 614 (e.g., symbol 2).

To deactivate each of the Rx chains 512a-f, the control circuitry 514 may send a deactivation instruction 522. When receiving the third subframe 520c, however, the control circuitry 514 may reactivate each of the deactivated Rx chains 512a-f. For example, the control circuitry 514 may send an activation instruction 524 causing each of the deactivated Rx chains 512a-f to be reactivated when receiving the third subframe 520c.

When receiving the third subframe 520c, the control circuitry 514 may determine that two sub-channels 610c, 610d included in the third subframe 520c carry a DMRS 614 indicating the inclusion of information 612 intended for the first UE 504. Therefore, according to the first configuration, the control circuitry 514 may refrain from deactivating any of the Rx chains 512a-f, even though the control circuitry 514 may determine that each of the remaining sub-channels 610a, 610b, 610e-n do not carry a DMRS 614 (e.g., indicating REs of the second subset are empty 616). Each of the Rx chains 512a-f may remain active when the next consecutive (fourth) subframe is received.

Figure 8:
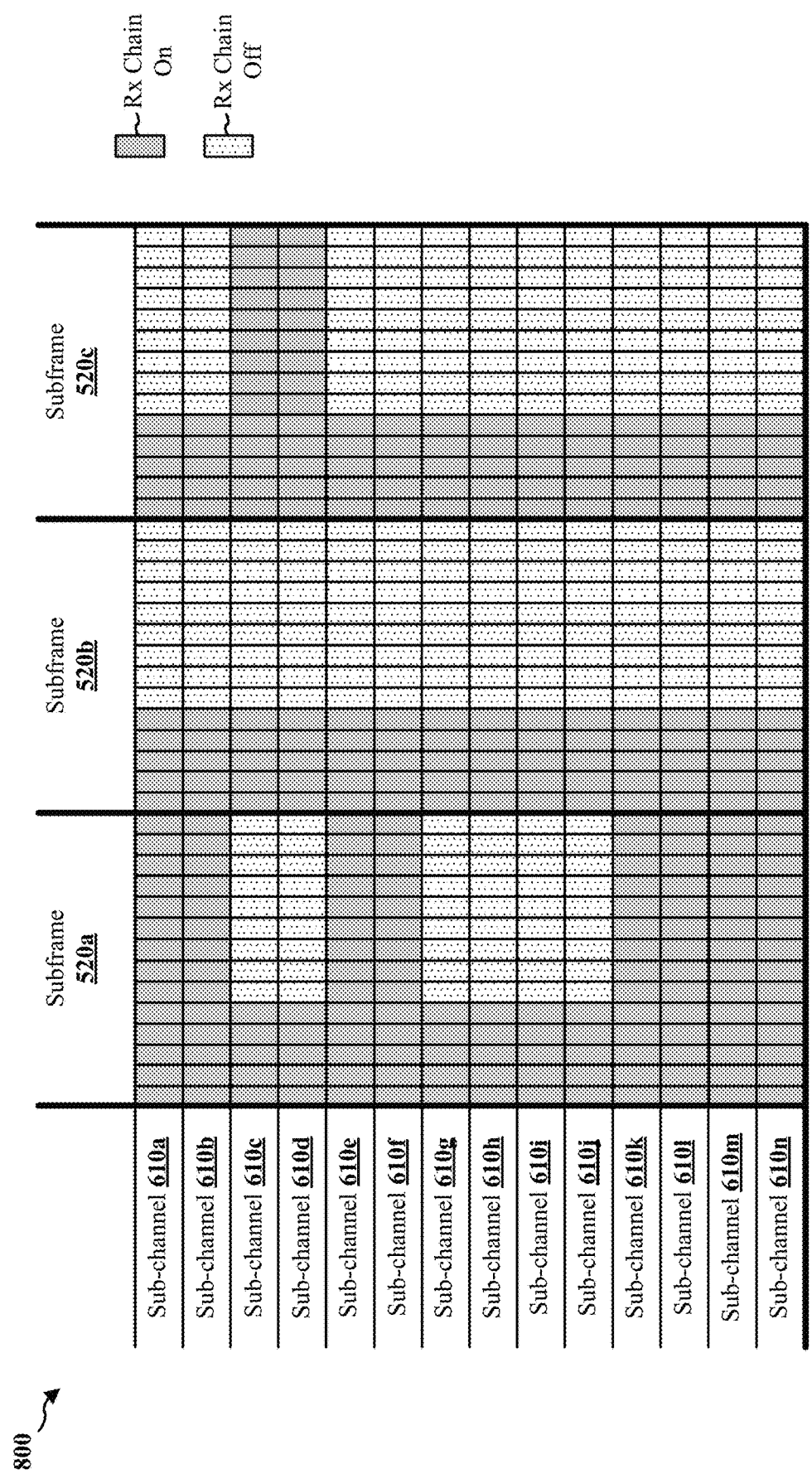
FIG. 8 is a diagram of another example of activated and deactivated receive (Rx) chains over a set of subframes.

With respect to FIG. 8, a block diagram illustrates example Rx chain configurations 800 across the set of subframes 520a-c for the second configuration of the control circuitry 514. According to the aforementioned second configuration, the control circuitry 514 may selectively activate and deactivate each of the Rx chains 512a-f according to which of the sub-channels 610a-n carries information 612 intended for the first UE 504. Potentially, then, the control circuitry 514 may deactivate a portion of the Rx chains 512a-f if the information 612 intended for the first UE 504 is absent from the associated ones of the sub-channels 610a-n, while the remaining other ones of the Rx chains 512a-f may remain active to receive information 612 intended for the first UE 504 that is carried on the associated other ones of the sub-channels 610a-n.

Beginning first with the first subframe 520a, each of the Rx chains 512a-f may be active and may each receive an associated one of the sub-channels 610a-n. Each of the Rx chains 512a-f may remain active at least until the first symbol allocated for a DMRS 614. For each of the sub-channels 610a-n, the control circuitry 514 may perform DMRS correlation at the first symbol allocated for a DMRS 614 (e.g., symbol 2).

According to the illustrated example, the control circuitry 514 may determine that each of the first subset of the sub-channels 610a, 610b, 610e, 610f, 610k, 610l, 610m, 610n carries a DMRS 614 indicating the inclusion of information 612 intended for the first UE 504 based on the DMRS correlation. Therefore, according to the first configuration, the control circuitry 514 may refrain from deactivating a subset of the Rx chains 512a-f associated with the first subset of sub-channels 610a, 610b, 610e, 610f, 610k, 610l, 610m, 610n. Still during the first subframe 520a, the control circuitry 514 may determine that each of the second subset of the sub-channels 610c, 610d, 610g, 610h, 610i, 610j, does not carry a DMRS 614 (e.g., indicating REs of the second subset are empty 616) and, therefore, may selectively deactivate a different subset of the Rx chains 512a-f associated with the second subset of the sub-channels 610c, 610d, 610g, 610h, 610i, 610j.

When subsequently receiving the second subframe 520b, each of the Rx chains 512a-f may be active initially, and may remain active at least until the first symbol allocated for a DMRS 614. Again, the control circuitry 514 may perform DMRS correlation at the first symbol allocated for a DMRS 614 (e.g., symbol 2) for each of the sub-channels 610a-n. The control circuitry 514 may determine that none of the sub-channels 610a-n of the second subframe 520b carries a DMRS 614. Therefore, the control circuitry 514 may deactivate all of the Rx chains 512a-f at a later symbol following the symbol at which DMRS correlation fails. For example, the control circuitry 514 may deactivate all of the Rx chains 512a-f at symbol 4 so that all of the Rx chains 512a-f are deactivated from symbols 5 through 13 when each correlation value determined for each of the sub-channels 610a-n fails to satisfy the threshold value at the first symbol potentially carrying a DMRS 614 (e.g., symbol 2).

To deactivate each of the Rx chains 512a-f, the control circuitry 514 may send a deactivation instruction 522. When receiving the third subframe 520c, however, the control circuitry 514 may reactivate each of the deactivated Rx chains 512a-f. For example, the control circuitry 514 may send an activation instruction 524 causing each of the deactivated Rx chains 512a-f to be reactivated when receiving the third subframe 520c.

When receiving the third subframe 520c, the control circuitry 514 may determine that two sub-channels 610c, 610d included in the third subframe 520c carry a DMRS 614 indicating the inclusion of information 612 intended for the first UE 504. Therefore, according to the second configuration, the control circuitry 514 may refrain from deactivating two of the Rx chains 512a-f associated with the two sub-channels 610c, 610d that carry information 612 intended for the first UE 504. As the remaining sub-channels 610a, 610b, 610e-n do not carry a DMRS 614 (e.g., indicating REs of the second subset are empty 616), the control circuitry 514 may deactivate the other ones of the Rx chains 512a-f associated with the remaining sub-channels 610a, 610b, 610e-n. The control circuitry 514 may then reactivate each of the deactivated ones of the Rx chains 512a-f when the next consecutive (fourth) subframe is received so that all of the Rx chains 512a-f are active to process all of the sub-channels 610a-n of that (fourth) subframe.

Accordingly, the control circuitry 514 may determine that each of the sub-channels 610a-n in a respective one of the subframes 520a-c is empty 616, and therefore does not carry information 612 intended for the first UE 504, if each R value calculated for each of the symbols allocated for a DMRS 614 (e.g., symbols 2, 5, 8, and 11) in the respective one of the subframes 520a-c fails to satisfy the threshold value.

Figure 9:
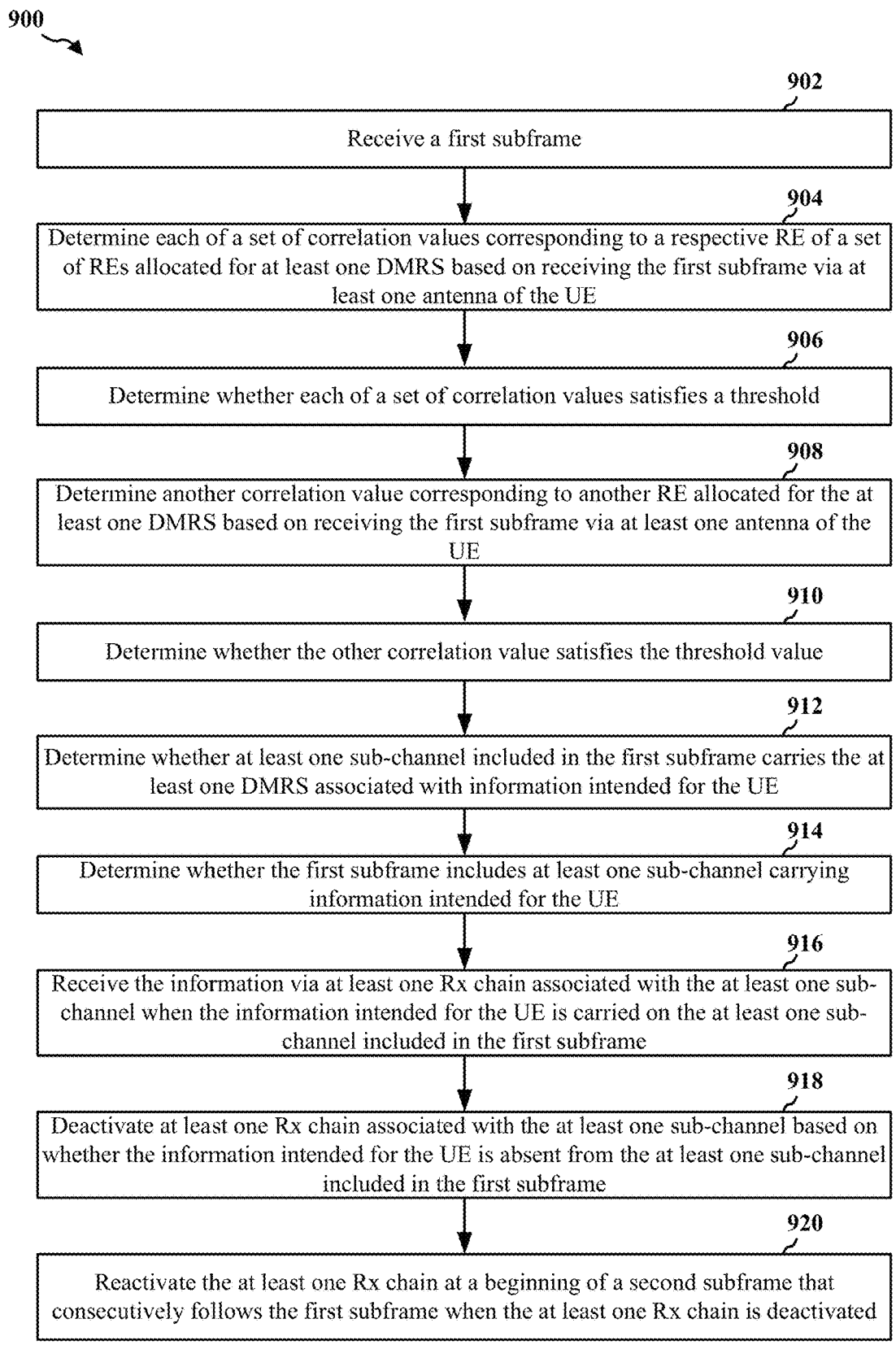
FIG. 9 is a flowchart of a method of wireless communication by a UE.

FIG. 9 is a flowchart of a method 900 of wireless communication. The method 900 may be performed by a UE (e.g., the UE 104, 350, 504; the apparatus 1102/1102'; the processing system 1214, which may include the memory 360 and which may be the entire UE 104, 350, 504 or a component of the UE 104, 350, 504, such as the TX processor 368, the RX processor 356, and/or the controller/processor 359). According to various aspects, one or more operations of the method 900 may be transposed, omitted, and/or contemporaneously performed.

At 902, the UE may receive a first subframe. For example, the UE may receive the first subframe from another UE and/or in association with CV2X communication. The first subframe may include at least one sub-channel (e.g., at least one RB having at least one 180 kHz sub-channel). In some aspects, the at least one sub-channel may be included in one of a PSCCH potentially carrying control information intended for the UE or a PSSCH potentially carrying data intended for the UE. In the context of FIGS. 5-8, the first UE 504 may receive the first subframe 520a from the second UE 550—e.g., the Rx chains 512a-f of the first UE 504 may receive an associated one of the sub-channels 610a-n included in the first subframe 520a.

At 904, the UE may determine each of a set of correlation values corresponding to a respective RE of a set of REs allocated for at least one DMRS based on receiving the first subframe via at least one antenna of the UE. Each of the set of REs may include a respective sub-channel of the at least one sub-channel over a symbol of a set of symbols included in the first subframe. In some aspects, the UE may determine a respective correlation value by, first, aligning the DMRS sequence in the time domain based on a timing offset estimation $\widehat{n_0}$, e.g., as shown in Equation 1:

$$\widetilde{s_{a,l}}[n] = s_{a,l}[n - \widehat{n_0}]$$ (Equation 1)

Second, the UE may calculate the correlation per antenna a and on one or more DMRS symbols M over the total number of samples per symbol $N_{FFT}$ in the configuration of the first subframe according to Equation 2:

$$\hat{R} = \sum_{a=0}^{1} \frac{1}{\sqrt{\hat{\sigma}_a^2}} \left| \sum_{l=0}^{M} \sum_{n=0}^{N_{FFT}-1} (y_{a,l}[n] \cdot conj(\widetilde{s_{a,l}}[n])) \right|^2 \quad \text{(Equation 2)}$$

Thus, the UE may determine a respective correlation value R for each of the sub-channels included in the first subframe. In the context of FIGS. 5-8, the control circuitry 514 of the first UE 504 may determine each of a set of correlation values corresponding to a respective RE of a set of REs allocated for at least one DMRS 614 based on receiving the first subframe 520a via at least one of the antenna modules 510a-c of the first UE 504. Each of the set of REs may include a respective one of the sub-channels 610a-n over a symbol of the set of symbols included in the first subframe 520a.

At 906, the UE may determine whether each of the correlation values satisfies a threshold value. For example, first, the UE may compare each correlation value R to the threshold value and, second, the UE may determine whether each correlation value $\hat{R}$ is greater than or equal to the threshold value. If a respective correlation value $\hat{R}$ is greater than or equal to the threshold value, then the correlation value $\hat{R}$ may satisfy the threshold value. Conversely, if a respective correlation value R is less than the threshold value, then the correlation value R may fail to satisfy the threshold value. In the context of FIGS. 5-8, the control circuitry 514 of the first UE 504 may determine whether each of the set of correlation values satisfies the threshold value.

At 908, the UE may determine, for each of the set of correlation values that is determined to satisfy the threshold value, another correlation value corresponding to another RE allocated for the at least one DMRS based on receiving the first subframe via at least one antenna of the UE. The other RE may include the respective sub-channel of the respective RE corresponding to one of the set of correlation values over another symbol of the set of symbols. In some aspects, the UE may determine another correlation value by, first, aligning the DMRS sequence in the time domain based on a timing offset estimation $\widetilde{n_0}$, e.g., as shown in Equation 1:

$$\widetilde{s_{a,l}}[n] = s_{a,l}[n - \widetilde{n_0}] \quad \text{(Equation 1)}$$

Second, the UE may calculate another correlation per antenna a and on one or more other DMRS symbols M+x over the total number of samples per symbol $N_{FFT}$ in the configuration of the first subframe according to Equation 3:

$$\hat{R}_x = \sum_{a=0}^{1} \frac{1}{\sqrt{\hat{\sigma}_a^2}} \left| \sum_{l=x}^{M+x} \sum_{n=0}^{N_{FFT}-1} (y_{a,l}[n] \cdot conj(\widetilde{s_{a,l}}[n])) \right|^2 \quad \text{(Equation 3)}$$

In Equation 3, x may correspond to the next DMRS symbol location (e.g., x may be equal to 1, 2, or 3, following DMRS symbol location 0). Thus, the UE may determine another respective correlation value $\hat{R}_x$ for each of the sub-channels included in the first subframe, e.g., in order to confirm that the respective first correlation value $\hat{R}$ for each of the sub-channels. In the context of FIGS. 5-8, the control circuitry 514 of the first UE 504 may determine, for each of the set of correlation values that is determined to satisfy the threshold value, another correlation value corresponding to another RE allocated for the at least one DMRS 614 based on receiving the first subframe 520a via at least one of the antenna modules 510a-c of the first UE 504. Each other RE may include the respective one of the sub-channels 610a-n of the respective RE corresponding to one of the set of correlation values over another symbol of the set of symbols included in the first subframe 520a.

At 910, the UE may determine, for each of the other correlation values, whether the other correlation value satisfies the threshold value. For example, first, the UE may compare each other correlation value $\hat{R}_x$ to the threshold value and, second, the UE may determine whether each other correlation value $\hat{R}_x$ is greater than or equal to the threshold value. If a respective other correlation value $\hat{R}_x$ is greater than or equal to the threshold value, then the respective other correlation value $\hat{R}_x$ may satisfy the threshold value. Conversely, if a respective other correlation value $\hat{R}_x$ is less than the threshold value, then the respective other correlation value $\hat{R}_x$ may fail to satisfy the threshold value. In the context of FIGS. 5-8, the control circuitry 514 of the first UE 504 may determine whether each of the other correlation values satisfies the threshold value.

At 912, the UE may determine whether at least one sub-channel included in the first subframe carries at least one DMRS associated with information (e.g., data and/or control information) intended for the UE. For example, first, the UE may determine whether each of the one or more correlation values (e.g., $\hat{R}$, $\hat{R}_x$, etc.) corresponding to one or more REs of a respective sub-channel satisfies the threshold value and, second, the UE may determine that the respective sub-channel carries at least one DMRS when each of the one or more correlation values corresponding to the one or more REs of the respective sub-channel satisfies the threshold value. For example, referring to FIGS. 5-8, the control circuitry 514 of the first UE 504 may determine whether at least one of the sub-channels 610a-n included in the first subframe 520a carries at least one DMRS 614 associated with information 612 intended for the first UE 504.

At 914, the UE may determine whether the first subframe includes at least one sub-channel carrying information (e.g., data and/or control information) intended for the UE. For example, first, the UE may determine whether a sub-channel carries at least one DMRS to be used for decoding information carried on the sub-channel and, second, the UE may determine whether the sub-channel carries information intended for the UE based on whether the sub-channel carries at least one DMRS. In the context of FIGS. 5-8, the control circuitry 514 of the first UE 504 may determine whether one or more of the sub-channels 610a-n of the first subframe 520a carries information 612 intended for the first UE 504, e.g., based on whether each of the one or more of the sub-channels 610a-n carries at least one DMRS 614.

At 916, the UE may receive the information via at least one Rx chain associated with the at least one sub-channel when the information intended for the UE is carried on the at least one sub-channel included in the first subframe. For example, each of the Rx chains of the UE may be associated with a respective one of the sub-channels included in the first subframe, and therefore, the UE may receive information carried on a respective sub-channel via the associated Rx chain. In the context of FIGS. 5-8, the first UE 504 may receive the information 612 via at least one of the Rx chains 512a-f associated with at least one of the sub-channels 610a-n when the information 612 intended for the first UE 504 is carried on the associated one of the sub-channels 610a-n included in the first subframe 520a.

At 918, the UE may deactivate the at least one Rx chain associated with the at least one sub-channel based on whether the information intended for the UE is absent from the at least one sub-channel included in the first subframe. For example, the UE may deactivate the at least one Rx chain by, first, sending a deactivation instruction to the at least one Rx chain and, second, reducing (e.g., stopping) the power supplied to the at least one Rx chain based on the deactivation instruction. In some aspects, the at least one Rx chain may include one or more components, such as an ADC, a mixer, a downconverter, and/or one or more other RF and/or beamforming components, and therefore, the UE may deactivate the at least one Rx chain by reducing (e.g., including reducing to zero) the power supplied to one or more of the components of the at least one Rx chain. In the context of FIGS. 5-8, the control circuitry 514 of the first UE 504 may deactivate at least one of the Rx chains 512*a-f* associated with at least one of the sub-channels 610*a-n* based on whether the information 612 intended for the first UE 504 is absent from the at least one of the sub-channels 610*a-n* included in the first subframe 520*a*. To deactivate each of the Rx chains 512*a-f*, the control circuitry 514 may send a deactivation instruction 522.

According to the first configuration, the UE may deactivate the at least one Rx chain associated with the at least one sub-channel based on whether the information intended for the UE is absent from the at least one sub-channel by deactivating every Rx chain associated with every sub-channel when none of the sub-channels carries information intended for the UE. However, the UE may refrain from deactivating any of the Rx chains when any of the sub-channels carries information intended for the UE.

In the context of FIGS. 5-7, the control circuitry 514 of the first UE 504 may refrain from deactivating any of the Rx chains 512*a-f* based on the information 612 intended for the first UE 504 being carried on a first subset of the sub-channels 610*a*, 610*b*, 610*e*, 610*f*, 610*k*, 610*l*, 610*m*, 610*n*, even though the control circuitry 514 may determine that each of the second subset of the sub-channels 610*c*, 610*d*, 610*g*, 610*h*, 610*i*, 610*j*, does not carry a DMRS 614 (e.g., indicating REs of the second subset are empty 616). However, the control circuitry 514 may deactivate all of the Rx chains 512*a-f* for at least a portion of the second subframe 520*b* based on each of the sub-channels 610*a-n* being empty 616.

According to the second configuration, the UE may individually deactivate each of the Rx chains according to which of the sub-channels carries information intended for the UE. For example, the UE may deactivate a portion of the Rx chains if the information intended for the UE is absent from the associated sub-channels, while the other Rx chains may remain active to receive information intended for the UE that is carried on the associated other sub-channels.

In the context of FIGS. 5, 6, and 8, the control circuitry 514 may determine that each of the first subset of the sub-channels 610*a*, 610*b*, 610*e*, 610*f*, 610*k*, 610*l*, 610*m*, 610*n* carries information 612 intended for the first UE 504, and therefore, the control circuitry 514 may refrain from deactivating a subset of the Rx chains 512*a-f* associated with the first subset of sub-channels 610*a*, 610*b*, 610*e*, 610*f*, 610*k*, 610*l*, 610*m*, 610*n*. Still during the first subframe 520*a*, the control circuitry 514 may determine that each of the second subset of the sub-channels 610*c*, 610*d*, 610*g*, 610*h*, 610*i*, 610*j* is empty 616, and therefore, the control circuitry 514 may individually deactivate a different subset of the Rx chains 512*a-f* associated with the second subset of the sub-channels 610*c*, 610*d*, 610*g*, 610*h*, 610*i*, 610*j*.

At 920, the UE may reactivate the at least one Rx chain at the beginning of a second subframe that consecutively follows the first subframe when the at least one Rx chain is deactivated. In other words, each Rx chain of the UE may be active at the beginning of each received subframe. In some aspects, the at least one Rx chain may include one or more components, such as an ADC, a mixer, a downconverter, and/or one or more other RF and/or beamforming components, and therefore, the UE may reactivate the at least one Rx chain by increasing (e.g., including starting) the power supplied to one or more of the components of the at least one Rx chain. In the context of FIGS. 5-8, the control circuitry 514 of the first UE 504 may reactivate at least one of the Rx chains 512*a-f* associated with at least one of the sub-channels 610*a-n* at the beginning of the second subframe 520*b* (and again at the beginning of the third subframe 520*c*). To reactivate each of the Rx chains 512*a-f*, the control circuitry 514 may send an activation instruction 524, e.g., contemporaneously with or prior to receiving and processing the second subframe 520*b*.

FIG. 10 is a flowchart of a method 1000 of wireless communication. The method 1000 may be performed by a UE (e.g., the UE 104, 350, 504; the apparatus 1102/1102'; the processing system 1214, which may include the memory 360 and which may be the entire UE 104, 350, 504 or a component of the UE 104, 350, 504, such as the TX processor 368, the RX processor 356, and/or the controller/processor 359). According to various aspects, one or more operations of the method 1000 may be transposed, omitted, and/or contemporaneously performed.

The method 1000 may be performed by a UE for DMRS correlation over a set REs allocated for a DMRS, and each of the REs may be one sub-channel over one symbol. In the context of FIGS. 5-6, the control circuitry 514 of the first UE 504 may perform the method 1000 on each of the sub-channels 610*a-n* over one or more of symbols 2, 5, 8, and 11 of each of the subframes 520*a-c*, for example, when each of the subframes 520*a-c* is configured with symbols 2, 5, 8, and 11 allocated for a DMRS.

The UE may perform the method 1000 in order to confirm that a sub-channel of a received subframe does, in fact, carry information (e.g., data and/or control information) intended for the UE by iteratively performing DMRS correlation at each of the symbols allocated for a DMRS. That is, upon determining that a sub-channel of a subframe carries a DMRS at an earlier symbol, the UE may advance to the next symbol allocated for the DMRS to confirm that the earlier DMRS correlation is correct. In so doing, the UE may prevent false positives resulting from inaccurate DMRS correlations, as DMRS correlations may be estimations susceptible to errors caused by noise, interference, chip design/implementation, and the like. Accordingly, the UE may increase the likelihood of correctly of deactivating one or more Rx chains, thereby increasing the frequency with which power may be saved.

First, at 1002, the UE may starting processing a received signal that includes a new subframe. For example, first, the UE may receive a signal including a new subframe via at least one antenna communicatively connected with at least one Rx chain of the UE and, second, the UE may begin decoding the new subframe. In the context of FIGS. 5-8, the first UE 504 may receive a signal including the first subframe 520*a* via at least one of the antenna modules 510*a-c* communicatively connected with the Rx chains 512*a-f*, and the control circuitry 514 of the first UE 504 may begin processing the first subframe 520*a*.

At 1004, for each sub-channel included in the new subframe, the UE may initialize a DMRS symbol variable M That is, the UE may initialize a respective DMRS symbol variable M for each sub-channel of the new subframe. For example, the UE may set M to an initial value, such as 1 or 0, which may be preconfigured and stored in memory of the UE. The DMRS symbol variable M may be bounded at the floor by the initial value, and may be bounded at the ceiling by the total number of DMRSs that one sub-channel can carry over the duration of one subframe (e.g., a subframe may be configured to carry 4 DMRSs on each sub-channel). In the context of FIGS. 5-8, the control circuitry 514 of the first UE 504 may initialize a DMRS symbol variable M (e.g., to 0 or 1), and the DMRS symbol variable M may have a maximum value (e.g., of 3, if initialized to 0, or 4, if initialized to 1) corresponding to the 4 DMRSs 614 configured on each of the sub-channels 610*a-n* that carries information 612 intended for the first UE 504.

At 1006, the UE may receive the $M^{th}$ DMRS symbol carried on the respective sub-channel. That is, the UE may process the $N^{th}$ subframe symbol of the new subframe on the respective sub-channel, and the $N^{th}$ subframe symbol may correspond to the $M^{th}$ DMRS symbol so that the $M^{th}$ DMRS symbol is received at the $N^{th}$ subframe symbol. In the context of FIGS. 5-8, the control circuitry 514 of the first UE 504 may receive the first DMRS 614 carried on a respective one of the sub-channels 610*a-n*, and the control circuitry 514 may locate the first DMRS 614 at symbol 2 according to the configuration of the first subframe 520*a*.

At 1008, the UE may calculate a correlation value based on DMRS correlation with the received signal on the $M^h$ DMRS symbol in time. For example, the UE may perform DMRS correlation for the respective sub-channel by, first, time-domain aligning the DMRS sequence at the $M^{th}$ DMRS symbol, e.g., according to Equation 1, supra. Second, the UE may calculate the correlation value for the respective sub-channel as the correlation per antenna and on one or more DMRS symbols over the total number of samples per symbol in the configuration of the new subframe, e.g., according to Equation 2, supra. In the context of FIGS. 5-8, the control circuitry 514 of the first UE 504 may calculate a correlation value R for a respective one of the sub-channels 610*a-n* based on DMRS with the received signal including the first subframe 520*a* on the first DMRS symbol in time. For example, the first DMRS symbol in time may correspond to M equal to 0 or 1 (e.g., depending upon the aspect), which may be located at symbol 2 on the respective one of the sub-channels 610*a-n* included in the first subframe 520*a*.

At 1010, the UE may determine whether the correlation value calculated for the DMRS symbol on the respective sub-channel satisfies a threshold value. For example, the UE may compare the correlation value with the threshold value, and the UE may determine whether the correlation value is either less than the threshold value or greater than or equal to the threshold value. In the context of FIGS. 5-8, the control circuitry 514 of the first UE 504 may determine whether the correlation value Ř for a respective one of the sub-channels 610*a-n* satisfies the threshold value.

If the UE determines the correlation value is less than the threshold value, then the UE may determine that the correlation value does not satisfy the threshold value. Accordingly, at 1012, the UE may deactivate the Rx chain associated with the respective sub-channel for which the correlation value is calculated. For example, the UE may deactivate the at least one Rx chain by, first, sending a deactivation instruction to the at least one Rx chain and, second, reducing (e.g., stopping) the power supplied to the at least one Rx chain based on the deactivation instruction.

According to the first configuration, the UE may deactivate the Rx chain associated with the respective sub-channel if all of the correlation values for all of the sub-channels fail to satisfy the threshold value. However, the UE may refrain from deactivating any of the Rx chains if any of the correlation values satisfy the threshold value. In the context of FIGS. 5-7, the control circuitry 514 of the first UE 504 may refrain from deactivating any of the Rx chains 512*a-f* because the each of the correlation values for the first subset of the sub-channels 610*a*, 610*b*, 610*e*, 610*f*, 610*k*, 610*l*, 610*m*, 610*n* satisfies the threshold value. However, the control circuitry 514 may deactivate all of the Rx chains 512*a-f* for at least a portion of the second subframe 520*b* because none of the correlation values for the sub-channels 610*a-n* satisfies the threshold value.

According to the second configuration, the UE may individually deactivate each of the Rx chains according to which of the sub-channels carries information intended for the UE. Therefore, the UE may deactivate the Rx chain associated with the respective sub-channel if the corresponding correlation value is determined to fail to satisfy the threshold value. In the context of FIGS. 5, 6, and 8, the control circuitry 514 of the first UE 504 may individually deactivate a subset of the Rx chains 512*a-f* associated with the second subset of the sub-channels 610*c*, 610*d*, 610*g*, 610*h*, 610*i*, 610*j*, which each correspond to a respective correlation value that fails to satisfy the threshold value.

At 1014, the UE may reactivate each of the deactivated Rx chains at the beginning of another subframe that consecutively follows the new subframe when the at least one Rx chain is deactivated. In other words, each Rx chain of the UE may be active at the beginning of each received subframe. In the context of FIGS. 5-8, the control circuitry 514 of the first UE 504 may reactivate any deactivated ones of the Rx chains 512*a-f* at the beginning of the second subframe 520*b*.

If the UE determines the correlation value is greater than or equal to the threshold value, then the UE may determine that the correlation value satisfies the threshold value. Accordingly, at 1016, the UE may increment the DMRS symbol variable M For example, the UE may add 1 to the current value of M. Thus, the UE may be configured to perform DMRS correlation on the next consecutive DMRS symbol if the earlier DMRS is estimated to satisfy the threshold value (thereby indicating that the respective sub-channel carries information intended for the UE). In the context of FIGS. 5-8, the control circuitry 514 of the first UE 504 may increment the DMRS symbol variable M, e.g., in order to receive the next DMRS symbol located at symbol 5 of the first subframe 520*a*.

Subsequently, the UE may return to 1006 in order to receive the $M^{th}$ DMRS symbol carried on the respective sub-channel, and iteratively perform DMRS correlation across one or more other DMRS symbols to confirm (or reverse) the estimation(s) of whether the respective sub-channel carries at least one DMRS indicating information intended for the UE.

Figure 11:
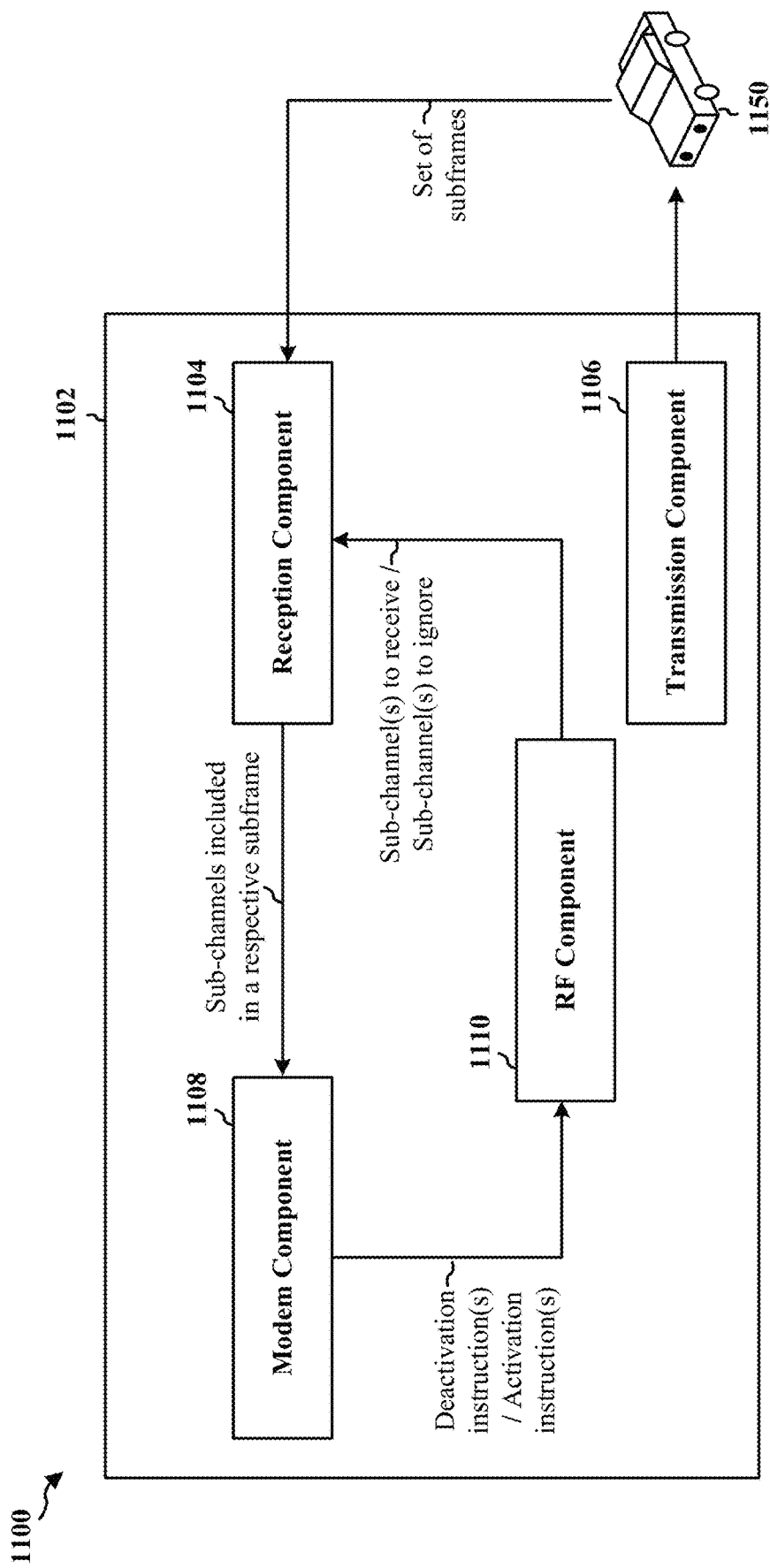
FIG. 11 is a conceptual data flow diagram illustrating the data flow between different means/components in an example apparatus.

FIG. 11 is a conceptual data flow diagram illustrating the data flow 1100 between different means/components in an example apparatus 1102. The apparatus 1102 may be a UE. According to various aspects, the apparatus 1102 may include a reception component 1104 configured to receive signals from another UE 1150 and, potentially, may include a transmission component 1106 configured to transmit signals to the other UE 1150.

The reception component 1104 may be configured to receive a set of subframes, including a first subframe, from the other UE 550, e.g., as described in connection with 902 of FIG. 9. The first subframe may include at least one sub-channel over a set of symbols. The at least one sub-channel may be included in a channel, such as a PSCCH or a PSSCH.

The apparatus 1102 may further include a modem component 1108 that may be configured to determine each of a set of correlation values corresponding to a respective RE of a set of REs allocated for at least one DMRS based on receiving the first subframe via at least one antenna of the apparatus 1102, e.g., as described in connection with 904 of FIG. 9. Each of the REs may include a respective sub-channel of the set of sub-channels over a symbol over the set of symbols included in the first subframe. The modem component 1108 may be further configured to determine whether each of the set of correlation values satisfies a threshold value, e.g., as described in connection with 906 of FIG. 9.

In addition, the modem component 1108 may be configured to determine, for each of the set of correlation values that is determined to satisfy the threshold value, another correlation value corresponding to another RE allocated for at least one DMRS based on receiving the first subframe via at least one antenna of the apparatus 1102, e.g., as described in connection with 908 of FIG. 9. The other RE may include the respective sub-channel of the respective RE corresponding to one of the set of correlation values over another symbol of the set of symbols. The modem component 1108 may be further configured to determine whether each of the other correlation values satisfies the threshold value, e.g., as described in connection with 910 of FIG. 9.

The modem component 1108 may be further configured to determine whether at least one sub-channel included in the first subframe carries at least one DMRS associated with information (e.g., data and/or control information) intended for the apparatus 1102, e.g., as described in connection with 912 of FIG. 9. In one aspect, the modem component 1108 may be configured to determine whether a respective sub-channel included in the first subframe carries the at least one DMRS based on whether a corresponding one of the set of correlation values is determined to satisfy the threshold value. In an further aspect, the modem component 1108 may be further configured to determine whether the respective sub-channel carries the at least one DMRS further based on whether the corresponding other correlation value is determined to satisfy the threshold value.

The modem component 1108 may be further configured to determine whether the first subframe includes at least one sub-channel carrying information intended for the apparatus 1102, e.g., as described in connection with 914 of FIG. 9. For example, the modem component 1108 may determine that the at least one sub-channel carries information intended for the apparatus 1102 when the at least one DMRS is determined to be carried on the at least one sub-channel, but may determine that the information intended for the apparatus 1102 is absent from the at least one sub-channel when the at least one DMRS is determined to be absent from the at least one sub-channel. The modem component 1108 may provide one or more deactivation instructions to the RF component 1110 based on whether the first subframe is determined to include at least one sub-channel carrying information intended for the apparatus 1102.

The RF component 1110 may configure the reception component 1104 to receive information intended for the apparatus 1102 via at least one Rx chain associated with the at least one sub-channel when the information intended for the UE is carried on the at least one sub-channel, e.g., as described in connection with 916 of FIG. 9. For example, the RF component 1110 may configure the a respective one of the Rx chains to remain active and/or open so that the reception component 1104 can receive the at least one sub-channel associated with the respective Rx chain.

The RF component 1110 may be configured to deactivate at least one Rx chain associated with the at least one sub-channel based on whether the information intended for the UE is absent from the at least one sub-channel included in the first subframe, e.g., as described in connection with 918 of FIG. 9. For example, the RF component 1110 may deactivate at least one Rx chain for each remaining symbol of the first subframe following a symbol of the first subframe in which the at least one DMRS is determined to be absent. In deactivating or closing a respective one of the Rx chains, the RF component 1110 may configure the reception component 1104 to refrain from receiving the associated one of the sub-channels.

In one aspect, the at least one sub-channel is determined to carry the at least one DMRS when at least one (e.g., any) of the set of correlation values satisfies the threshold value. Thus, the RF component 1110 may refrain from deactivating any Rx chain if any of the sub-channels included in the first subframe carries information intended for the apparatus 1102. However, the RF component 1110 may deactivate every Rx chain if information intended for the apparatus 1102 is determined to be absent from all of the sub-channels included in the first subframe.

In another aspect, the RF component 1110 may be configured to deactivate each Rx chain that is associated with each sub-channel corresponding to one of the set of correlation values determined to fail the satisfy the threshold value. Correspondingly, the RF component 1110 may configure the reception component 1104 to receive information intended for the apparatus 1102 via each other Rx chain that is associated with each other sub-channel corresponding to another of the set of correlation values determined to satisfy the threshold value. In other words, the RF component 1110 may individually deactivate one or more Rx chains that are associated with sub-channels corresponding to correlation values that fail to satisfy the threshold value.

After the first subframe, the reception component 1104 may receive a second subframe of the set of subframes. Contemporaneously with or prior to reception of the second subframe, the modem component 1108 may provide at least one activation instruction to the RF component 1110. In response to the at least one activation instruction, the RF component 1110 may activate (or keep activate) each Rx chain associated with each sub-channel included in the second subframe. Accordingly, the RF component 1110 may configure the reception component 1104 to receive each sub-channel of the second subframe when the second subframe is initially received.

The apparatus 1102 may include additional components that perform each of the blocks of the algorithm in the aforementioned flowcharts of FIGS. 9-10. As such, each block in the aforementioned flowcharts of FIGS. 9-10 may be performed by a component and the apparatus 1102 may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 12:
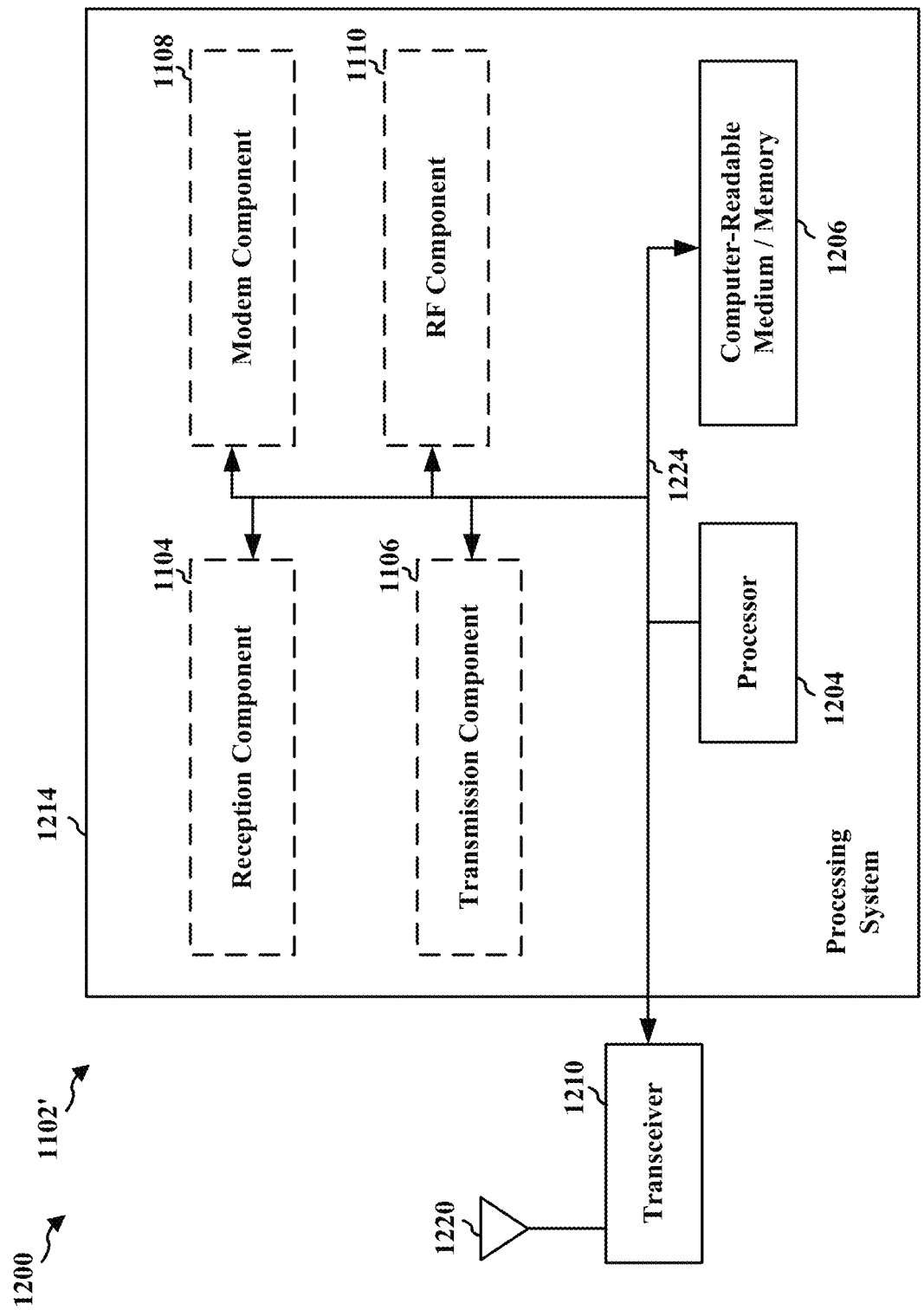
FIG. 12 is a diagram illustrating an example of a hardware implementation for an apparatus employing a processing system.

FIG. 12 is a diagram illustrating an example of a hardware implementation 1200 for an apparatus 1102' employing a processing system 1214. The processing system 1214 may be implemented with a bus architecture, represented generally by the bus 1224. The bus 1224 may include any number of interconnecting buses and bridges depending on the specific application of the processing system 1214 and the overall design constraints. The bus 1224 links together various circuits including one or more processors and/or hardware components, represented by the processor 1204, the components 1104, 1106, 1108, and the computer-readable medium/memory 1206. The bus 1224 may also link various other circuits such as timing sources, peripherals, voltage regulators, and power management circuits, which are well known in the art, and therefore, will not be described any further.

The processing system 1214 may be coupled to a transceiver 1210. The transceiver 1210 is coupled to one or more antennas 1220. The transceiver 1210 provides a means for communicating with various other apparatus over a transmission medium. The transceiver 1210 receives a signal from the one or more antennas 1220, extracts information from the received signal, and provides the extracted information to the processing system 1214, specifically the reception component 1104. In addition, the transceiver 1210 receives information from the processing system 1214, specifically the transmission component 1106, and based on the received information, generates a signal to be applied to the one or more antennas 1220. The processing system 1214 includes a processor 1204 coupled to a computer-readable medium/memory 1206. The processor 1204 is responsible for general processing, including the execution of software stored on the computer-readable medium/memory 1206. The software, when executed by the processor 1204, causes the processing system 1214 to perform the various functions described supra for any particular apparatus. The computer-readable medium/memory 1206 may also be used for storing data that is manipulated by the processor 1204 when executing software. The processing system 1214 further includes at least one of the components 1104, 1106, 1108, 1110. The components may be software components running in the processor 1204, resident/stored in the computer-readable medium/memory 1206, one or more hardware components coupled to the processor 1204, or some combination thereof. The processing system 1214 may be a component of the UE 350 and may include the memory 360 and/or at least one of the TX processor 368, the RX processor 356, and the controller/processor 359. Alternatively, the processing system 1214 may be the entire UE (e.g., see 350 of FIG. 3).

According to some aspects, the apparatus 1102/1102' for wireless communication includes means for determining whether a first subframe includes at least one sub-channel carrying information intended for the UE; means for receiving the information via at least one Rx chain associated with the at least one sub-channel when the information intended for the UE is carried on the at least one sub-channel included in the first subframe; and means for deactivating the at least one Rx chain associated with the at least one sub-channel based on whether the information intended for the UE is absent from the at least one sub-channel included in the first subframe.

In one aspect, the apparatus 1102/1102' further includes means for receiving the first subframe; and means for determining whether the at least one sub-channel included in the first subframe further carries at least one DMRS associated with the information. In this aspect, the at least one sub-channel included in the first subframe is determined to carry the information intended for the UE when the at least one DMRS is determined to be carried on the at least one sub-channel, and the information intended for the UE is determined to be absent from the at least one sub-channel when the at least one DMRS is determined to be absent from the at least one sub-channel.

In one aspect, the apparatus 1102/1102' further includes means for determining each of a set of correlation values corresponding to a respective RE of a set of REs allocated for the at least one DMRS based on receiving the first subframe via at least one antenna of the UE, each of the set of REs including a respective sub-channel of the at least one sub-channel over a symbol of a set of symbols included in the first subframe; and means for determining whether each of the set of correlation values satisfies a threshold value. In this aspect, the at least one sub-channel included in the first subframe is determined to carry the at least one DMRS associated with the information based on whether at least one of the set of correlation values is determined to satisfy the threshold value.

In one aspect, the at least one sub-channel is determined to carry the at least one DMRS when at least one of the set of correlation values satisfies the threshold value. In another aspect, the means for deactivating the at least one Rx chain associated with the at least one sub-channel is configured to deactivate each Rx chain that is associated with one of the at least one sub-channel of one of the set of REs corresponding to one of the set of correlation values determined to fail to satisfy the threshold value, and the means for receiving the information via the at least one Rx chain associated with the at least one sub-channel is configured to receive the information via each other Rx chain that is associated with another one of the at least one sub-channel of another one of the set of REs corresponding to another one of the set of correlations value determined to satisfy the threshold value.

In one aspect, the apparatus 1102/1102' further includes, for each of the set of correlation values that is determined to satisfy the threshold value: means for determining another correlation value corresponding to another RE allocated for the at least one DMRS based on receiving the first subframe via at least one antenna of the UE, the other RE including the respective sub-channel of the respective RE corresponding to one of the set of correlation values over another symbol of the set of symbols; and means for determining whether the other correlation value satisfies the threshold value. In this aspect, the respective sub-channel of the respective RE is determined to carry the at least one DMRS associated with the information further based on whether the other correlation value is determined to satisfy the threshold value.

In one aspect, the at least one Rx chain is deactivated for one or more remaining symbols of the first subframe following a symbol of the first subframe in which the at least one DMRS is determined to be absent. In another aspect, the apparatus 1102/1102' further includes means for reactivating the at least one Rx chain at a beginning of a second subframe that consecutively follows the first subframe when the at least one Rx chain is deactivated. In a further aspect, the at least one sub-channel is included in a channel, and the channel includes one of a PSCCH or a PSSCH, and the information intended for the UE includes one of control information on the PSCCH or data on the PSSCH.

The aforementioned means may be one or more of the aforementioned components of the apparatus 1102 and/or the processing system 1214 of the apparatus 1102' configured to perform the functions recited by the aforementioned means. As described supra, the processing system 1214 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication by a user equipment (UE), the method comprising:
   receiving a first subframe;
   determining whether the first subframe includes at least one sub-channel carrying information intended for the UE;
   determining whether the at least one sub-channel included in the first subframe further carries at least one demodulation reference signal (DMRS) associated with the information,
   wherein the at least one sub-channel included in the first subframe is determined to carry the information intended for the UE when the at least one DMRS is determined to be carried on the at least one sub-channel, and the information intended for the UE is determined to be absent from the at least one sub-channel when the at least one DMRS is determined to be absent from the at least one sub-channel;
   receiving the information via at least one receive (Rx) chain associated with the at least one sub-channel when the information intended for the UE is carried on the at least one sub-channel included in the first subframe; and
   deactivating the at least one Rx chain associated with the at least one sub-channel based on whether the information intended for the UE is absent from the at least one sub-channel included in the first subframe.

2. The method of claim 1, further comprising:
   determining each of a set of correlation values corresponding to a respective resource element (RE) of a set of REs allocated for the at least one DMRS based on receiving the first subframe via at least one antenna of the UE, wherein each of the set of REs comprises a respective sub-channel of the at least one sub-channel over a symbol of a set of symbols included in the first subframe; and
   determining whether each of the set of correlation values satisfies a threshold value,
   wherein the at least one sub-channel included in the first subframe is determined to carry the at least one DMRS associated with the information based on whether at least one of the set of correlation values is determined to satisfy the threshold value.

3. The method of claim 2, wherein the at least one sub-channel is determined to carry the at least one DMRS when at least one of the set of correlation values satisfies the threshold value.

4. The method of claim 2, wherein the deactivating the at least one Rx chain associated with the at least one sub-channel based on whether the information intended for the UE is absent from the at least one sub-channel included in the first subframe comprises:
   deactivating each Rx chain that is associated with one of the at least one sub-channel of one of the set of REs corresponding to one of the set of correlation values determined to fail to satisfy the threshold value, and wherein
   the receiving the information via the at least one Rx chain associated with the at least one sub-channel when the information intended for the UE is carried on the at least one sub-channel included in the first subframe comprises:
   receiving the information via each other Rx chain that is associated with another one of the at least one sub-channel of another one of the set of REs corresponding to another one of the set of correlation values determined to satisfy the threshold value.

5. The method of claim 2, further comprising, for each of the set of correlation values that is determined to satisfy the threshold value:
   determining another correlation value corresponding to another RE allocated for the at least one DMRS based on receiving the first subframe via at least one antenna of the UE, wherein the other RE comprises the respective sub-channel of the respective RE corresponding to one of the set of correlation values over another symbol of the set of symbols; and
   determining whether the other correlation value satisfies the threshold value, wherein the respective sub-channel of the respective RE is determined to carry the at least one DMRS associated with the information further based on whether the other correlation value is determined to satisfy the threshold value.

6. The method of claim 1, wherein the at least one Rx chain is deactivated for one or more remaining symbols of the first subframe following a symbol of the first subframe in which the at least one DMRS is determined to be absent.

7. The method of claim 1, further comprising:
reactivating the at least one Rx chain at a beginning of a second subframe that consecutively follows the first subframe when the at least one Rx chain is deactivated.

8. The method of claim 1, wherein the at least one sub-channel is included in a channel, the channel comprises one of a physical sidelink control channel (PSCCH) or a physical sidelink shared channel (PSSCH), and the information intended for the UE comprises one of control information on the PSCCH or data on the PSSCH.

9. An apparatus for wireless communication within a User Equipment (UE), the apparatus comprising:
a memory; and
at least one processor coupled to the memory and configured to:
receive a first subframe;
determine whether the first subframe includes at least one sub-channel carrying information intended for the UE;
determine whether the at least one sub-channel included in the first subframe further carries at least one demodulation reference signal (DMRS) associated with the information,
wherein the at least one sub-channel included in the first subframe is determined to carry the information intended for the UE when the at least one DMRS is determined to be carried on the at least one sub-channel, and the information intended for the UE is determined to be absent from the at least one sub-channel when the at least one DMRS is determined to be absent from the at least one sub-channel;
receive the information via at least one receive (Rx) chain associated with the at least one sub-channel when the information intended for the UE is carried on the at least one sub-channel included in the first subframe; and
deactivate the at least one Rx chain associated with the at least one sub-channel based on whether the information intended for the UE is absent from the at least one sub-channel included in the first subframe.

10. The apparatus of claim 9, wherein the at least one processor is further configured to:
determine each of a set of correlation values corresponding to a respective resource element (RE) of a set of REs allocated for the at least one DMRS based on receiving the first subframe via at least one antenna of the UE, wherein each of the set of REs comprises a respective sub-channel of the at least one sub-channel over a symbol of a set of symbols included in the first subframe; and
determine whether each of the set of correlation values satisfies a threshold value,
wherein the at least one sub-channel included in the first subframe is determined to carry the at least one DMRS associated with the information based on whether at least one of the set of correlation values is determined to satisfy the threshold value.

11. The apparatus of claim 10, wherein the at least one sub-channel is determined to carry the at least one DMRS when at least one of the set of correlation values satisfies the threshold value.

12. The apparatus of claim 10, wherein the deactivation of the at least one Rx chain associated with the at least one sub-channel based on whether the information intended for the UE is absent from the at least one sub-channel included in the first subframe comprises to:
deactivate each Rx chain that is associated with one of the at least one sub-channel of one of the set of REs corresponding to one of the set of correlation values determined to fail to satisfy the threshold value, and wherein
the reception of the information via the at least one Rx chain associated with the at least one sub-channel when the information intended for the UE is carried on the at least one sub-channel included in the first subframe comprises to:
receive the information via each other Rx chain that is associated with another one of the at least one sub-channel of another one of the set of REs corresponding to another one of the set of correlation values determined to satisfy the threshold value.

13. The apparatus of claim 10, wherein the at least one processor is further configured to, for each of the set of correlation values that is determined to satisfy the threshold value:
determine another correlation value corresponding to another RE allocated for the at least one DMRS based on receiving the first subframe via at least one antenna of the UE, wherein the other RE comprises the respective sub-channel of the respective RE corresponding to one of the set of correlation values over another symbol of the set of symbols; and
determine whether the other correlation value satisfies the threshold value,
wherein the respective sub-channel of the respective RE is determined to carry the at least one DMRS associated with the information further based on whether the other correlation value is determined to satisfy the threshold value.

14. The apparatus of claim 9, wherein the at least one Rx chain is deactivated for one or more remaining symbols of the first subframe following a symbol of the first subframe in which the at least one DMRS is determined to be absent.

15. The apparatus of claim 9, wherein the at least one processor is further configured to:
reactivate the at least one Rx chain at a beginning of a second subframe that consecutively follows the first subframe when the at least one Rx chain is deactivated.

16. The apparatus of claim 9, wherein the at least one sub-channel is included in a channel, the channel comprises one of a physical sidelink control channel (PSCCH) or a physical sidelink shared channel (PSSCH), and the information intended for the UE comprises one of control information on the PSCCH or data on the PSSCH.

17. An apparatus for wireless communication within a user equipment (UE), the apparatus comprising:
means for receiving a first subframe;
means for determining whether the first subframe includes at least one sub-channel carrying information intended for the UE;
means for determining whether the at least one sub-channel included in the first subframe further carries at least one demodulation reference signal (DMRS) associated with the information, wherein the at least one sub-channel included in the first subframe is determined to carry the information intended for the UE when the at least one DMRS is determined to be carried on the at least one sub-channel, and the information intended for the UE is determined to be absent from the at least one sub-channel when the at least one DMRS is determined to be absent from the at least one sub-channel;

means for receiving the information via at least one receive (Rx) chain associated with the at least one sub-channel when the information intended for the UE is carried on the at least one sub-channel included in the first subframe; and means for deactivating the at least one Rx chain associated with the at least one sub-channel based on whether the information intended for the UE is absent from the at least one sub-channel included in the first subframe.

18. The apparatus of claim 17, further comprising:

means for determining each of a set of correlation values corresponding to a respective resource element (RE) of a set of REs allocated for the at least one DMRS based on receiving the first subframe via at least one antenna of the UE, wherein each of the set of REs comprises a respective sub-channel of the at least one sub-channel over a symbol of a set of symbols included in the first subframe; and means for determining whether each of the set of correlation values satisfies a threshold value, wherein the at least one sub-channel included in the first subframe is determined to carry the at least one DMRS associated with the information based on whether at least one of the set of correlation values is determined to satisfy the threshold value.

19. The apparatus of claim 18, wherein the at least one sub-channel is determined to carry the at least one DMRS when at least one of the set of correlation values satisfies the threshold value.

20. The apparatus of claim 18, wherein the means for deactivating the at least one Rx chain associated with the at least one sub-channel is configured to:

deactivate each Rx chain that is associated with one of the at least one sub-channel of one of the set of REs corresponding to one of the set of correlation values determined to fail to satisfy the threshold value, and wherein the means for receiving the information via the at least one Rx chain associated with the at least one sub-channel is configured to:

receive the information via each other Rx chain that is associated with another one of the at least one sub-channel of another one of the set of REs corresponding to another one of the set of correlation values determined to satisfy the threshold value.

21. The apparatus of claim 18, further comprising, for each of the set of correlation values that is determined to satisfy the threshold value:

means for determining another correlation value corresponding to another RE allocated for the at least one DMRS based on receiving the first subframe via at least one antenna of the UE, wherein the other RE comprises the respective sub-channel of the respective RE corresponding to one of the set of correlation values over another symbol of the set of symbols; and means for determining whether the other correlation value satisfies the threshold value, wherein the respective sub-channel of the respective RE is determined to carry the at least one DMRS associated with the information further based on whether the other correlation value is determined to satisfy the threshold value.

22. The apparatus of claim 17, wherein the at least one Rx chain is deactivated for one or more remaining symbols of the first subframe following a symbol of the first subframe in which the at least one DMRS is determined to be absent.

23. The apparatus of claim 17, further comprising:

means for reactivating the at least one Rx chain at a beginning of a second subframe that consecutively follows the first subframe when the at least one Rx chain is deactivated.

24. The apparatus of claim 17, wherein the at least one sub-channel is included in a channel, the channel comprises one of a physical sidelink control channel (PSCCH) or a physical sidelink shared channel (PSSCH), and the information intended for the UE comprises one of control information on the PSCCH or data on the PSSCH.

25. A computer-readable medium storing computer-executable code for wireless communication by a user equipment (UE), the code when executed by at least one processor of the UE cause the at least one processor to:

receive a first subframe;

determine whether the first subframe includes at least one sub-channel carrying information intended for the UE;

determine whether the at least one sub-channel included in the first subframe further carries at least one demodulation reference signal (DMRS) associated with the information, wherein the at least one sub-channel included in the first subframe is determined to carry the information intended for the UE when the at least one DMRS is determined to be carried on the at least one sub-channel, and the information intended for the UE is determined to be absent from the at least one sub-channel when the at least one DMRS is determined to be absent from the at least one sub-channel;

receive the information via at least one receive (Rx) chain associated with the at least one sub-channel when the information intended for the UE is carried on the at least one sub-channel included in the first subframe; and deactivate the at least one Rx chain associated with the at least one sub-channel based on whether the information intended for the UE is absent from the at least one sub-channel included in the first subframe.

* * * * *